(12) United States Patent
Tamiya

(10) Patent No.: US 7,738,112 B2
(45) Date of Patent: Jun. 15, 2010

(54) DISPLACEMENT DETECTION APPARATUS, POLARIZATION BEAM SPLITTER, AND DIFFRACTION GRATING

(75) Inventor: Hideaki Tamiya, Kanagawa (JP)

(73) Assignee: Mori Seiki Co., Ltd, Nara (JP)

( * ) Notice: Subject to any disclaimer, the term of this patent is extended or adjusted under 35 U.S.C. 154(b) by 633 days.

(21) Appl. No.: 11/676,406

(22) Filed: Feb. 19, 2007

(65) Prior Publication Data

US 2007/0195334 A1     Aug. 23, 2007

(30) Foreign Application Priority Data

Feb. 20, 2006   (JP)   ............................ P2006-042190

(51) Int. Cl.
*G01B 9/02*   (2006.01)
*G01B 11/02*   (2006.01)

(52) U.S. Cl. ...................................... 356/494; 356/499

(58) Field of Classification Search ............ 250/231.16, 250/237 G; 356/491, 494, 499
See application file for complete search history.

(56) References Cited

U.S. PATENT DOCUMENTS

| | | | | |
|---|---|---|---|---|
| 4,975,570 | A | * | 12/1990 | Nishimura et al. ...... 250/231.16 |
| 4,979,826 | A | * | 12/1990 | Ishizuka et al. ............. 356/499 |
| 5,000,542 | A | * | 3/1991 | Nishimura et al. ........... 359/437 |
| 5,017,777 | A | * | 5/1991 | Ishizuka et al. ......... 250/231.16 |
| 5,182,610 | A | * | 1/1993 | Shibata ........................ 356/490 |
| 5,666,196 | A | * | 9/1997 | Ishii et al. .................... 356/499 |
| 5,717,488 | A | * | 2/1998 | Watanabe .................... 356/499 |
| 6,657,181 | B1 | * | 12/2003 | Ishizuka et al. ............. 250/216 |
| 6,744,520 | B2 | * | 6/2004 | Chang et al. ................. 356/499 |
| 7,034,947 | B2 | * | 4/2006 | Ishizuka et al. ............. 356/492 |
| 7,034,948 | B2 | * | 4/2006 | Tamiya et al. ............... 356/499 |
| 7,187,451 | B2 | * | 3/2007 | Kao et al. ..................... 356/499 |
| 7,389,595 | B2 | * | 6/2008 | Meissner et al. .............. 33/707 |
| 7,394,550 | B2 | * | 7/2008 | Takahashi et al. ........... 356/499 |
| 2004/0080755 | A1 | * | 4/2004 | Tamiya et al. ................ 356/499 |
| 2004/0095583 | A1 | * | 5/2004 | Tamiya et al. ................ 356/499 |

FOREIGN PATENT DOCUMENTS

JP        2004-144581        5/2004
JP        2004144581         5/2004

* cited by examiner

*Primary Examiner*—Gregory J Toatley, Jr.
*Assistant Examiner*—Scott M Richey
(74) *Attorney, Agent, or Firm*—K&L Gates LLP

(57) ABSTRACT

A displacement detection apparatus, polarization beam splitter, and diffraction grating are provided. A displacement detection apparatus configured to detect a displacement includes a light source, a reflective diffraction grating configured to receive the two polarized beams, two polarization altering elements configured to alter the polarization states of two diffracted beams of the two polarized beams obtained at the diffraction grating, two mirrors configured to reflect the beams whose polarization states have been altered at the two polarization altering elements and to guide the reflected beams to the two polarization altering elements, each of the mirrors corresponding to the polarization altering elements, and a polarization beam splitter provided as a unit with at least the two polarization altering elements, the polarization beam splitter including a polarizing and splitting surface and a transmissive area.

15 Claims, 15 Drawing Sheets

LISSAJOUS FIGURE

DISPLACEMENT DETECTION APPARATUS, POLARIZATION BEAM SPLITTER, AND DIFFRACTION GRATING

CROSS REFERENCES TO RELATED APPLICATIONS

The present application claims priority to Japanese Patent Application JP 2006-042190 filed in the Japanese Patent Office on Feb. 20, 2006, the entire contents of which are incorporated herein by reference.

BACKGROUND

The present application relates to a displacement detection apparatus configured to detect a displacement (movement) of a scale using interference of light and relates to a polarization beam splitter and a diffraction grating installed in the displacement detection apparatus.

Recently, fixed-point detection apparatuses and displacement detection apparatuses using light-emitting diodes and laser devices have high resolution that enables a measurement of displacement smaller than 1 nm. Among such displacement detection apparatuses, the displacement detection apparatus disclosed in Japanese Unexamined Patent Application Publication No. 2004-144581 includes a movable scale (12) having a first area (12a) for recording position information at predetermined intervals and a second area (12b) for recording position information at predetermined intervals different from that in the first area (12a). A first reading unit (10) reads a signal of diffracted light from the first area (12a) of the scale (12), whereas a second reading unit (11) reads a signal of diffracted light from the second area (12b) (for example, refer to Japanese Unexamined Patent Application Publication No. 2004-144581). By detecting the phases of the readout signals and comparing each two phases with the displacement detection apparatus, an origin signal indicating the origin position used as a reference of the displacement amount. In other words, the above-described fixed-point detection apparatus is capable of detecting an origin position in this way and is used together with the displacement detection apparatus.

In the displacement detection apparatus according to Japanese Unexamined Patent Application Publication No. 2004-144581, a position for reading out position information from the first area (12a) and a position for reading out position information from the second area (12b) are aligned on an inner line. Thus, an accurate origin signal can be generated without being affected by Abbe error.

Since, in general, with such a displacement detection apparatus, the optical system becomes complex, there is a problem in that the size of the apparatus increases. Therefore, there is a need for reduction in size. Moreover, since the optical system is complex, it is important to maintain high assembly accuracy of the optical system. When the assembly accuracy is low, distortion may be generated in the optical system and the electric-signal processing system when the displacement detection apparatus continuously used.

SUMMARY

A small displacement detection apparatus that is highly reliably even when used continuously and a polarization beam splitter and a diffraction grating to be installed on the displacement detection apparatus is provided according to an embodiment.

The present application provides a displacement detection apparatus and so on that are capable of accurately detecting two-dimensional displacement.

Accordingly, a displacement detection apparatus according to an embodiment is configured to detect a displacement on the basis of the received-light intensity of an interference beam of two polarized beams obtained by splitting a laser beam and includes the following elements:

a light source configured to emit the laser beam to be split into the two polarized beams;

a reflective diffraction grating configured to receive the two polarized beams;

two polarization altering elements configured to alter the polarization states of two diffracted beams of the two polarized beams obtained at the diffraction grating;

two mirrors configured to reflect the beams whose polarization states have been altered at the two polarization altering elements and to guide the reflected beams to the two polarization altering elements, each of the mirrors corresponding to the polarization altering elements; and a polarization beam splitter provided as a unit with at least the two polarization altering elements, the polarization beam splitter including a polarizing and splitting surface configured to split the laser beam to generate the two polarized beams and a transmissive area configured to guide the two polarized beams generated at the polarizing and splitting surface to the diffraction grating and to guide two return beams from the two polarization altering elements to the polarizing and splitting surface via the diffraction grating so as to obtain the interference beam.

Since, according to an embodiment, a reflective diffraction grating is used, the diffractive beams generated at the diffraction grating can be reflected, the size of the displacement detection apparatus can be reduced. Furthermore, since polarization altering elements are provided on the polarization beam splitter as a unit, assembly accuracy can be maintained at a high level, and the reliability of the displacement detection apparatus is maintained.

To reduce the size by using a reflective diffraction grating and to enable the polarization altering elements to be provided as a unit with the polarization beam splitter, a polarization beam splitter having a "transmissive area" is used. By including a transmissive area, the polarization beam splitter is structured as a block, and the first polarization element can be provided as a unit with the polarization beam splitter.

According to an embodiment, to "provide a member as a unit of another member" refers to a state in which the members are fixed while being in contact or adjacent to each other.

With the displacement detection apparatus according to an embodiment, each mirror is provided as a unit with each polarization altering element. In this way, the polarization beam splitter, the two polarization altering elements, and the two mirrors are provided as a unit. Accordingly, the assembly accuracy can be maintained at an even higher level, and the reliability of the displacement detection apparatus is maintained.

According to an embodiment, the diffraction grating includes a first grating disposed on a first line and a second grating disposed on a second line orthogonally intersecting with the first line on a plane on which the first grating is disposed, the first grating and the second grating being disposed two-dimensionally symmetrical on the plane; the polarizing and splitting surface of the polarization beam splitter includes a first polarizing and splitting surface configured to generate two first polarized beams and a second polarizing and splitting surface configured to generate a second polarized beam, the second polarizing and splitting surface being disposed on a plane different from a plane on which the first polarizing and splitting surface is disposed; and the transmissive area of the polarization beam splitter guides the first polarized beams generated at the first polarizing and splitting surface to the first grating and guides the second polarized beams generated at the second polarizing and splitting surface to the second grating.

In this way, the center of measurement on the first line and the center of measurement on the second line can be matched. For example, by simply combining two one-dimensional displacement detection apparatuses and positioning these close to each other, a two-dimensional displacement detection apparatus may be constituted. Actually, however, the centers of measurement cannot be matched on a two orthogonally intersecting axes. Therefore, measurement error occurs. An embodiment provides a two-dimensional displacement detection apparatus that solves such problem.

According to an embodiment, the first polarizing and splitting surface and the second polarizing and splitting surface orthogonally intersect each other.

According to an embodiment, the incident angle on the diffraction grating of the polarized beam and the diffraction angle of the polarized beam at the diffraction grating are substantially the same. In this way, even when the relative positions of the diffraction grating and the polarization beam splitter are displaced in a direction orthogonal to the plane (including the measurement line) on which the diffraction grating is disposed (i.e., height direction), the entire optical system is not affected. Thus, the position accuracy of the polarization beam splitter in the height direction can not have to be maintained at a high level.

The displacement detection apparatus according to an embodiment further includes a beam generating generator configured to generate first and second laser beams from the laser beam emitted from the light source, wherein the diffraction grating includes first areas having a first grating pitch and second areas having a second grating pitch different from the first grating pitch, wherein the polarizing and splitting surface of the polarization beam splitter splits the first laser beam to generate two first polarized beams and splits the second laser beam to generate two second polarized beams, and wherein the transmissive area of the polarization beam splitter guides the two first polarized beams to the first areas and guides the two second polarized beams to the second areas. In this way, for example, an origin signal on one of the measurement lines used for displacement detection can be generated on the basis of, for example, the phase difference of the interference beam of the two first polarized beams and the interference beam of the two second polarized beams.

The displacement detection apparatus according to an embodiment further includes a first beam generator configured to generate first and second laser beams and a second beam generator configured to generate third and fourth laser beams, wherein the diffraction grating includes a first grating including first areas having a first grating pitch and second areas having a second grating pitch different from the first grating pitch and a second grating including third areas having the first grating pitch and fourth areas having the second grating pitch, wherein the first polarizing and splitting surface of the polarization beam splitter splits the first laser beam to generate the two first polarized beams and splits the second laser beam to generate the two second polarized beams, wherein the second polarizing and splitting surface of the polarization beam splitter splits the third laser beam to generate two third polarized beams and splits the fourth laser beam to generate two fourth polarized beams, and wherein the transmissive area of the polarization beam splitter guides the two first polarized beams, the two second polarized beams, the two third polarized beams, and the two fourth polarized beams to the first, second, third, and fourth areas, respectively. In this way, origin signals on two orthogonally intersecting measurement lines can be generated. An embodiment may include two light sources so that two laser beams are generated from each of the light sources.

According to an embodiment, the diffraction grating is a volume-type hologram including an incident surface on which the two polarized beams are incident and a reflective mesh film provided on the incident surface.

According to an embodiment, the transmissive area of the polarization beam splitter is constituted of glass having an absolute value of an expansion coefficient of $1 \times 10^{-6}$ or smaller. By using such glass having a small expansion coefficient, the displacement detection apparatus is less likely to be affected by a temperature change in the environment.

According to an embodiment, the polarizing and splitting surface of the polarization beam splitter generates the two polarized beams so that the two polarized beams move away from each other, and the transmissive area of the polarization beam splitter includes a reflective surface for emitting the two polarized beams moving away from the polarization beam splitter so that the two polarized beams move closer to each other.

A displacement detection apparatus according to another embodiment configured to detect a two-dimensional displacement on the basis of the received-light intensity of a first interference beam of two first polarized beams and the received-light intensity of a second interference beam of two second polarized beams, the first and second polarized beams being included in a plurality of polarized beams obtained by splitting a laser beam and includes the following elements:

a light source configured to emit the laser beam to be split into the plurality of polarized beams;

a diffraction grating including a first grating disposed on a first line, the two first polarized beams being incident on the first grating and a second grating disposed on a second line orthogonally intersecting with the first line on a plane on which the first grating is disposed, the two second polarized beams being incident on the second grating, the first grating and the second grating being disposed two-dimensionally symmetrical on the plane;

four polarization altering elements configured to alter the polarization states of four diffracted beams of the two first polarized beams and the two second polarized beams obtained at the diffraction grating;

fourth mirrors configured to reflect the four beams whose polarization states have been altered at the polarization altering elements and to guide the reflected beams to the four polarization altering elements, each of the mirrors corresponding to each of the polarization altering elements; and a polarization beam splitter including a first polarizing and splitting surface configured to split the laser beam to generate the two first polarized beams, a second polarizing and splitting surface configured to split the laser beam to generate the two second polarized beams, the second polarizing and splitting surface being disposed on a plane different from the first polarizing and splitting surface, and a transmissive area configured to guide the two first polarized beams to the first grating, to guide the two second polarized beams to the second grating, and to guide fourth return beams from the four polarization altering elements to the corresponding first and second polarizing and splitting surfaces via the diffraction grating so as to obtain the first and second interference beams.

According to an embodiment, the first grating and the second grating of the diffraction grating are disposed on the same plane in a two-dimensionally symmetrical manner, and a polarization beam splitter configured to guide two first polarized beams to the first grating and to guide two second polarized beams to the second grating is provided. In this way, as described above, the center of measurement on the first line and the center of measurement on the second line can be matched, and measurement errors are not generated.

The diffraction grating according to an embodiment may be a transmissive or reflective diffraction grating.

The displacement detection apparatus according to an embodiment further includes a first beam generator configured to generate first and second laser beams and a second beam generator configured to generate third and fourth laser beams, wherein the diffraction grating includes the first grating including first areas having a first grating pitch and second areas having a second grating pitch different from the first grating pitch and the second grating including third areas having the first grating pitch and fourth areas having the second grating pitch, wherein the first polarizing and splitting surface of the polarization beam splitter splits the first laser beam to generate two first polarized beams and splits the third laser beam to generate the two third polarized beams, wherein the second polarizing and splitting surface of the polarization beam splitter splits the second laser beam to generate the two second polarized beams and splits the fourth laser beam to generate two fourth polarized beams, and wherein the transmissive area of the polarization beam splitter guides the two first polarized beams and the two third polarized beams to the first and second areas, respectively, and guides the two second polarized beams and the two fourth polarized beams to the second and fourth areas, respectively. In this way, origin signals can be generated on two measurement lines orthogonally intersecting with each other. According to an embodiment, two light sources may be provided, and two laser beams may be generated from each light source.

A polarization beam splitter according to an embodiment is used for a displacement detection apparatus including a light source for emitting a laser beam, a diffraction grating for receiving a plurality of polarized beams obtained by splitting the laser beam emitted from the light source, a plurality of polarization altering elements for altering the polarization states of a plurality of diffracted beams of the plurality of polarized beams obtained at the diffraction grating, and a plurality of mirrors for reflecting the beams whose polarization states are altered by the polarization altering elements and for guiding the reflected beams to the polarization altering elements, each of the mirrors corresponding to each of the polarization altering elements, and includes a polarizing and splitting surface configured to split the laser beam and generate the plurality of polarized beams, and a transmissive area configured to guide the polarized beams generated by the polarizing and splitting surface to the diffraction grating and to guide return beams from the polarization altering elements to the polarizing and splitting surface via the diffraction grating so as to obtain interference beams of the polarized beams.

A diffraction grating according to an embodiment is used for a displacement detection apparatus including a light source for generating a laser beam and beam generator for generating first, second, third, and fourth laser beams from the laser beam emitted from the light source, the displacement detection apparatus detecting a two-dimensional displacement on the basis of the received-light intensities of a first interference beam of two first polarized beams obtained by splitting the first laser beam and a second interference beam of two second polarized beams obtained by splitting the second laser beam, the received-light intensities of a third interference beam of two third polarized beams obtained by splitting the third laser beam and a fourth interference beam of two fourth polarized beams obtained by splitting the fourth laser beam, and includes a first grating disposed on a first line, the first grating including first areas having a first grating pitch, the first areas receiving the two first polarized beams and second areas having a second pitch different from the first pitch, the second areas receiving the two second polarized beams; and a second grating disposed on a second line orthogonally intersecting with the first line on a plane on which the first grating is disposed, the second grating including third areas having the first grating pitch, the third areas receiving the two third polarized beams, and fourth areas having the second pitch, the fourth areas receiving the two fourth polarized beams.

As described above, according to an embodiment, the size of the displacement detection apparatus can be reduced, and the reliability of the displacement detection apparatus can be maintained even when the apparatus is contentiously used.

Additional features and advantages are described herein, and will be apparent from, the following Detailed Description and the figures.

BRIEF DESCRIPTION OF THE FIGURES

FIG. 8 is a side view illustrating, in detail, the positions of the main PBS, a first quarter wavelength plate, and so on;

DETAILED DESCRIPTION

The present application will be described below in further detail with reference to the drawings.

Figure 1:
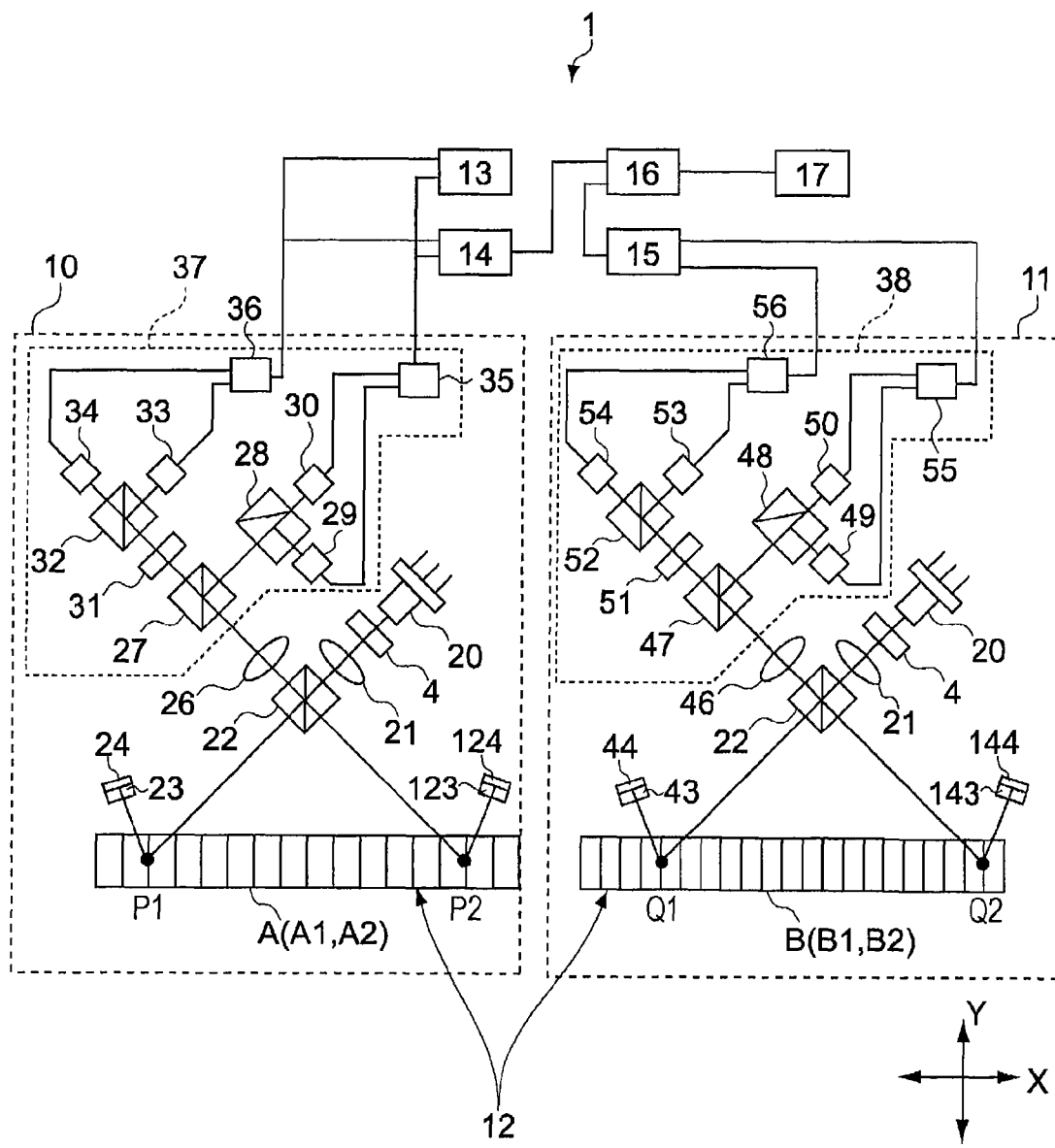
FIG. 1 illustrates the principle of a displacement detection apparatus according to an embodiment.
Figure 2:
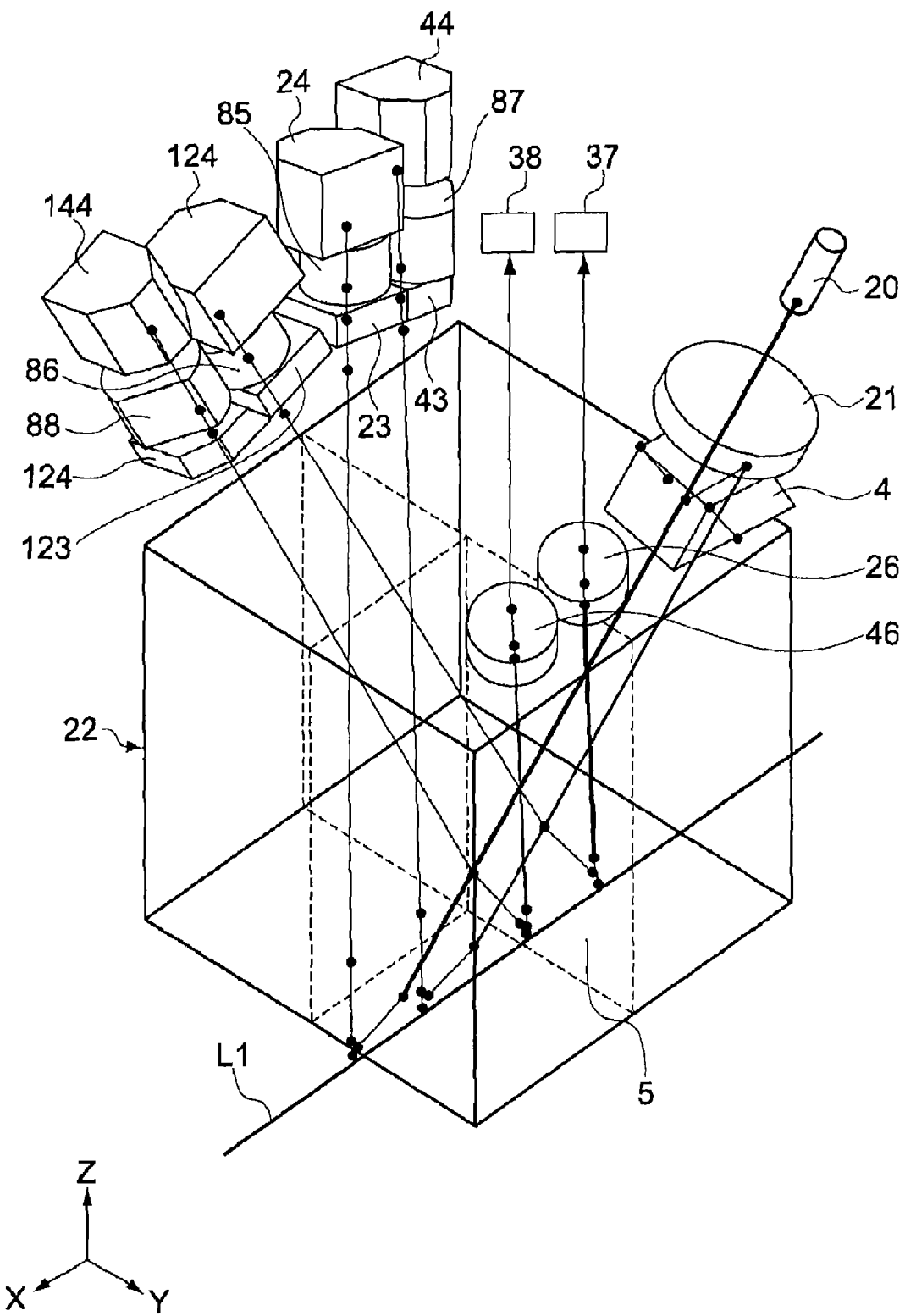
FIG. 2 is a perspective view of an actual optical system of a displacement detection apparatus.

FIG. 1 illustrates an optical system for describing the principle of a displacement detection apparatus according to an embodiment. FIG. 2 is a perspective view illustrating an actual optical system of the displacement detection apparatus. Since FIG. 1 is provided merely to describe the principle, the positions of the optical components shown in FIG. 1 and the positions of the optical components shown in FIG. 2 may differ.

A displacement detection apparatus 1 includes a first phase detecting unit 10, a second phase detecting unit 11, a reflective diffraction grating (scale) 12, and an incremental-signal generator 13, a first phase detector 14, a second phase detector 15, a phase comparator 16, and a pulsed signal generator 17.

As shown in FIG. 1, the first phase detecting unit 10 includes a coherent light source 20, a first lens 21, a first beam splitter (BS) 4, a main polarization beam splitter (PBS) 22, a first quarter wavelength plate 23, a mirror 24, a second quarter wavelength plate 123, a mirror 124, a second lens 26, and first light-reception processing system 37.

FIG. 2 is a schematic block diagram of the first light-reception processing system 37. The light source 20 does not necessarily have to be disposed in the position shown in the drawing. Instead, a laser beam may be incident on the first lens 21 through an optical fiber from a light source not shown in the drawing. As shown in FIG. 2, it is desirable that, in an actual optical system, suitable lenses 85 and 86 are interposed between the first quarter wavelength plate 23 and the mirror 24 and between the second quarter wavelength plate 123 and the mirror 124, respectively, to shape the laser beam.

The first light-reception processing system 37 includes a second beam splitter (BS) 27, a second PBS 28, a first photoelectric converter 29, a second photoelectric converter 30, a fifth quarter wavelength plate 31, a third PBS 32, a third photoelectric converter 33, a fourth photoelectric converter 34, a first differential amplifier 35, and a second differential amplifier 36. The first phase detecting unit 10 reads the diffraction grating on the diffraction grating 12 and outputs the readout result to the incremental-signal generator 13 and the first phase detector 14.

As shown in FIG. 1, the second phase detecting unit 11 shares the light source 20, the first lens 21, the first BS 4, and the main PBS 22. The second phase detecting unit 11 includes a third quarter wavelength plate 43, a mirror 44, a fourth quarter wavelength plate 143, a mirror 144, a third lens 46, and a second light-receiving processing system 38.

As shown in FIG. 2, in an actual optical system, it is desirable to interpose appropriate lenses 87 and 88 between the third quarter wavelength plate 43 and the mirror 44 and between the fourth quarter wavelength plate 143 and the mirror 144, respectively, to shape the laser beam.

The second light-receiving processing system 38 has a structure similar to that of the first light-reception processing system 37 and includes a second BS 47, a second PBS 48, a first photoelectric converter 49, a second photoelectric converter 50, a fifth quarter wavelength plate 51, a third PBS 52, a third photoelectric converter 53, a fourth photoelectric converter 54, a first differential amplifier 55, and a second differential amplifier 56. The second phase detecting unit 11 reads the diffraction grating on the diffraction grating 12 and outputs the readout result to the second phase detector 15.

Figure 3:
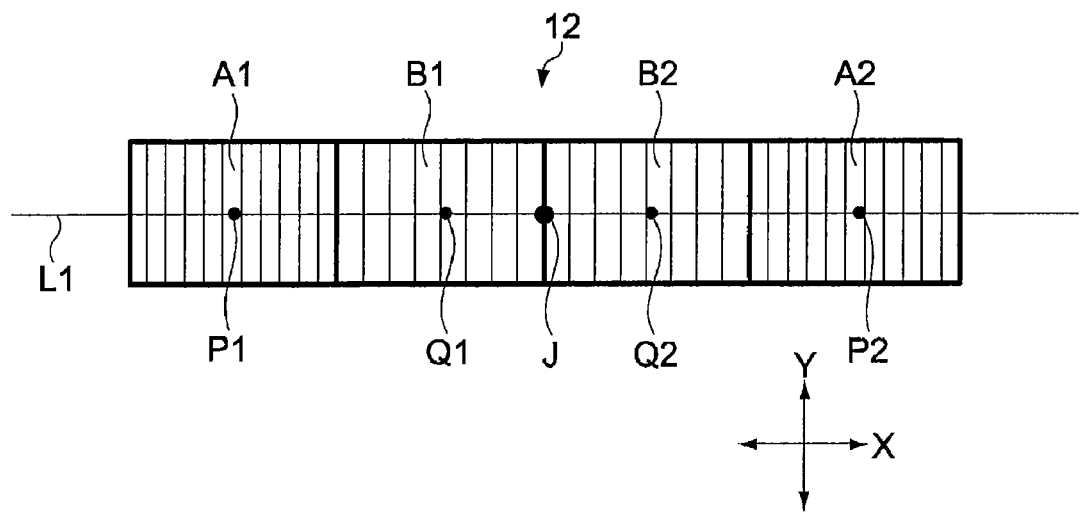
FIG. 3 is a plan view of a diffraction grating.

Now, the diffraction grating 12 will be described. FIG. 3 is a plan view illustrating the refrigerant circuit 12. The diffraction grating 12 has first areas A1 and A2 having a grating pitch A and a second areas B1 and B2 having a grating pitch A+A/n (where n is a real number except for 0) that differs from the grating pitch A of the first area A1 and A2. The first areas A1 and A2 and the second areas B1 and B2 are aligned on a line L1 in the x direction, which is the measurement direction. The diffraction grating 12 is attached to an object whose displacement is to be measured, and the displacement detection apparatus 1 detects the displacement when the object moves in the x direction. Hereinafter, the first areas may be simply referred to as "first areas A," and the second areas be simply referred to as "first areas B."

In the refrigerant circuit 12, illustrated in FIG. 3, a point J is the center of the refrigerant circuit 12, i.e., a point in the center of the x direction and in the center of the y direction orthogonal to the x direction. The imaginary line L1 is defined as passing through the point J, as described below. The incident angle of the beams from the light source 20 to the main PBS 22 is set or the main PBS 22 is designed, so that all polarized beams generated at the main PBS 22 are incident on the line L1 passing through the point J. More specifically, incident point (points P1 and P2) of laser beams to the first areas A1 and A2, respectively, and incident point (points Q1 and Q2) of laser beams to the second areas B1 and B2, respectively, are aligned on the line L1. The first areas A1 and A2 are disposed in such a manner as to sandwich the second areas B1 and B2. The diffraction grating 12 is two-dimensionally symmetrical (on the xy plane).

The grating pitch A of the first areas A1 and A2 is set to, for example, 0.55 μm, but is not limited thereto. As shown in FIG. 3, the first and second areas A and B may be provided on the same diffraction grating 12 or may be provided on separate diffraction gratings 12. When the first and second areas A and B are provided on separate diffraction gratings 12, both grating are fixed on the same base and is formed so that they are displaced by the same amount in the same displacement direction. However, in such a case, as described above, the first areas A1 and A2 and the second areas B1 and B2 are disposed two-dimensionally in a symmetrical manner, and each diffraction grating should be fixed to the base.

As described above, the diffraction grating 12 may be a flat diffraction grating or may be a volume type hologram. When a volume type hologram is used, the volume hologram may include a metal film grating of, for example, silver or copper.

Figure 4:
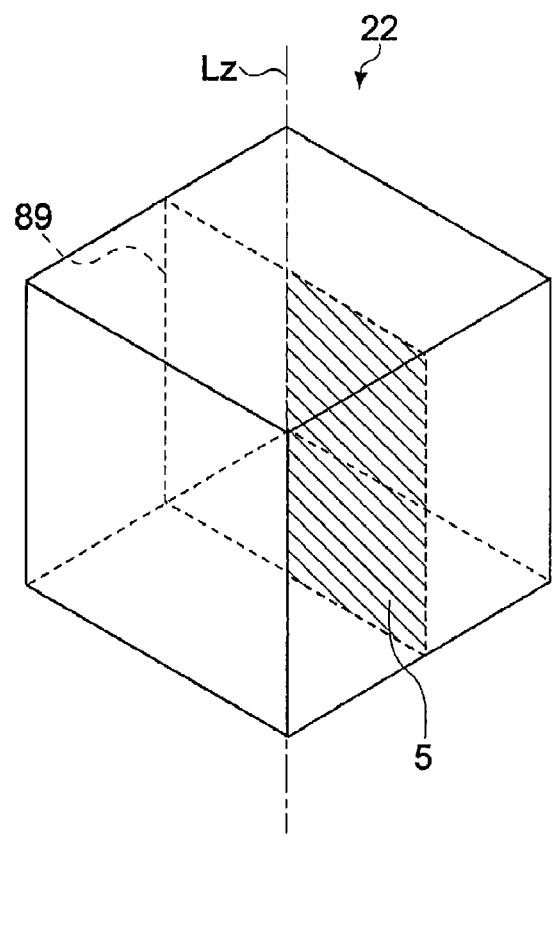
FIG. 4 is a perspective view illustrating the structure of a main PBS.
Figure 5:
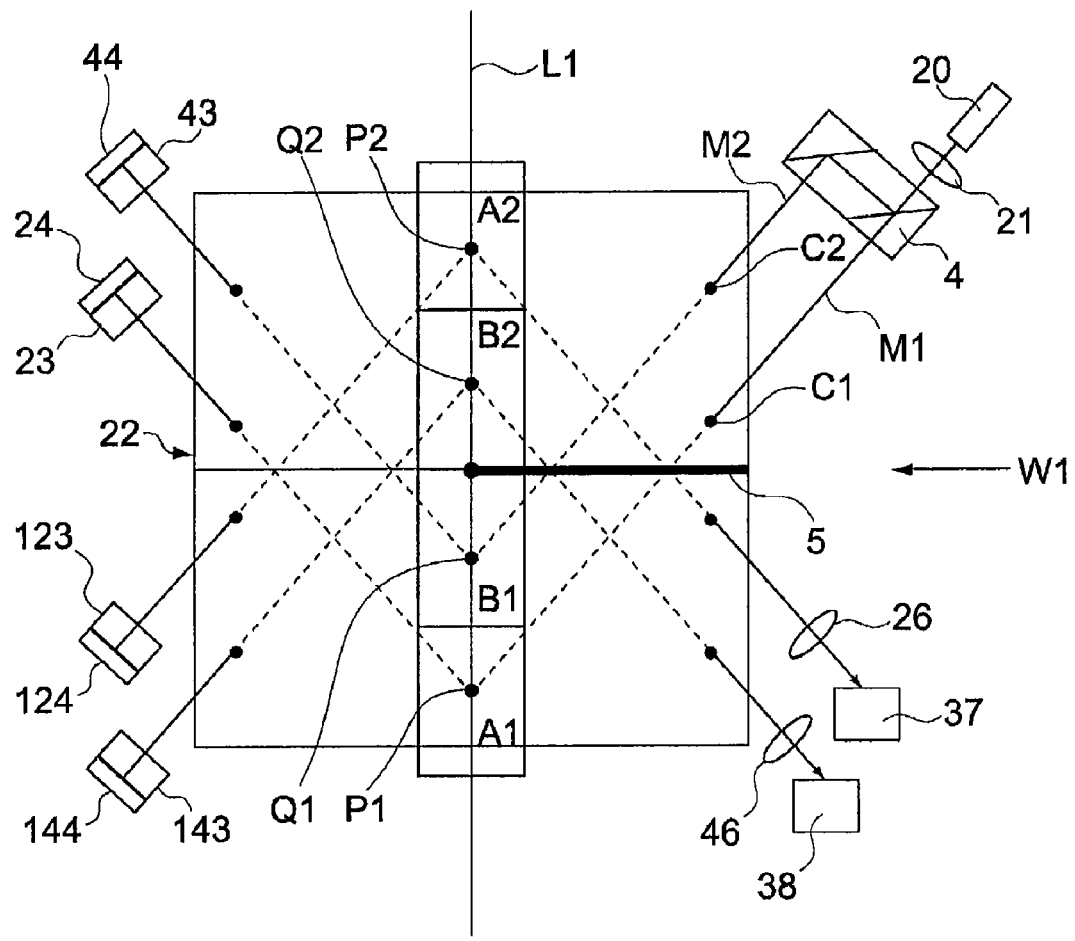
FIG. 5 is a plan view of the main PBS illustrated in FIG. 4.
Figure 6:
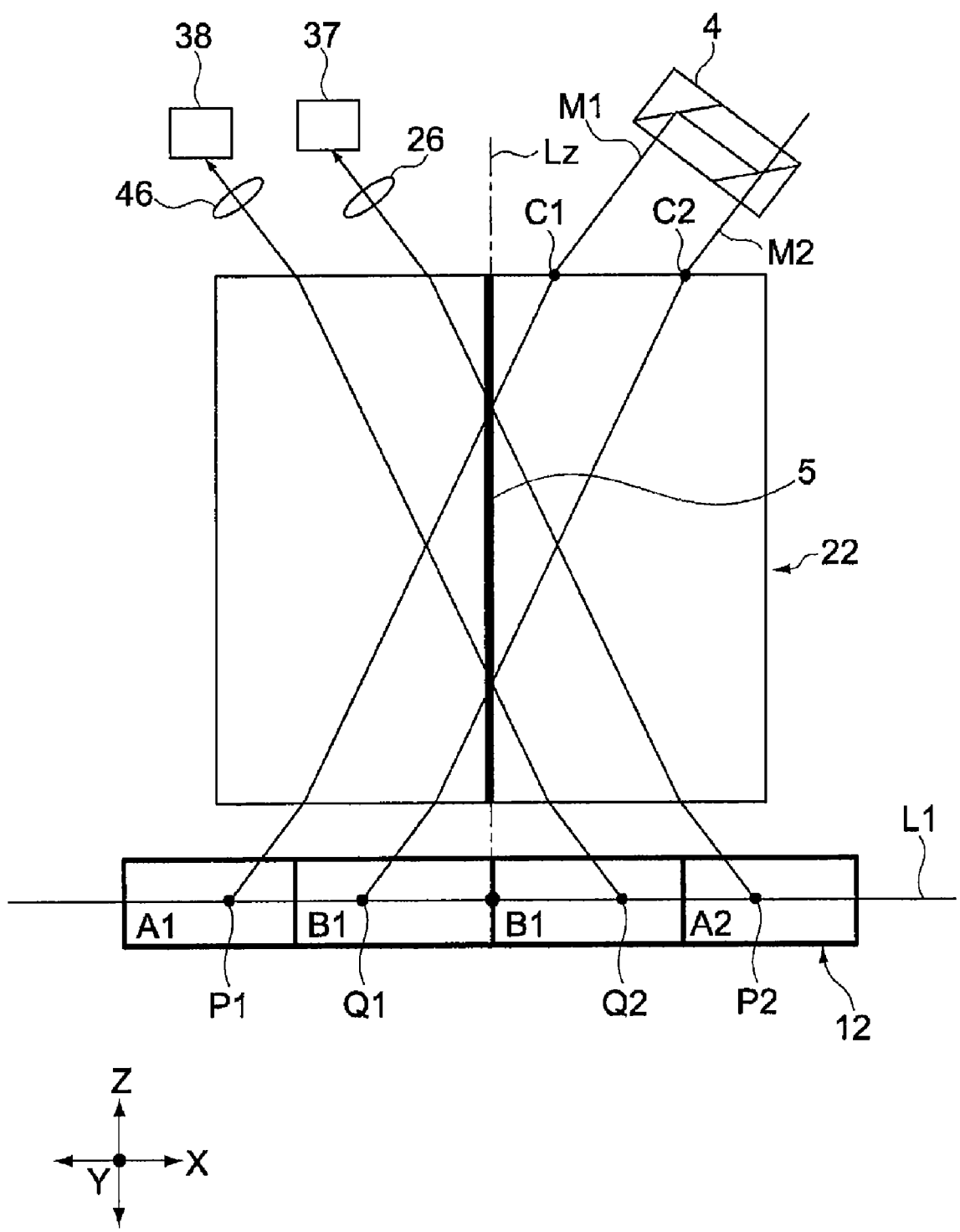
FIG. 6 is a side view of the main PBS illustrated in FIG. 5 viewed from direction W1.
Figure 7:
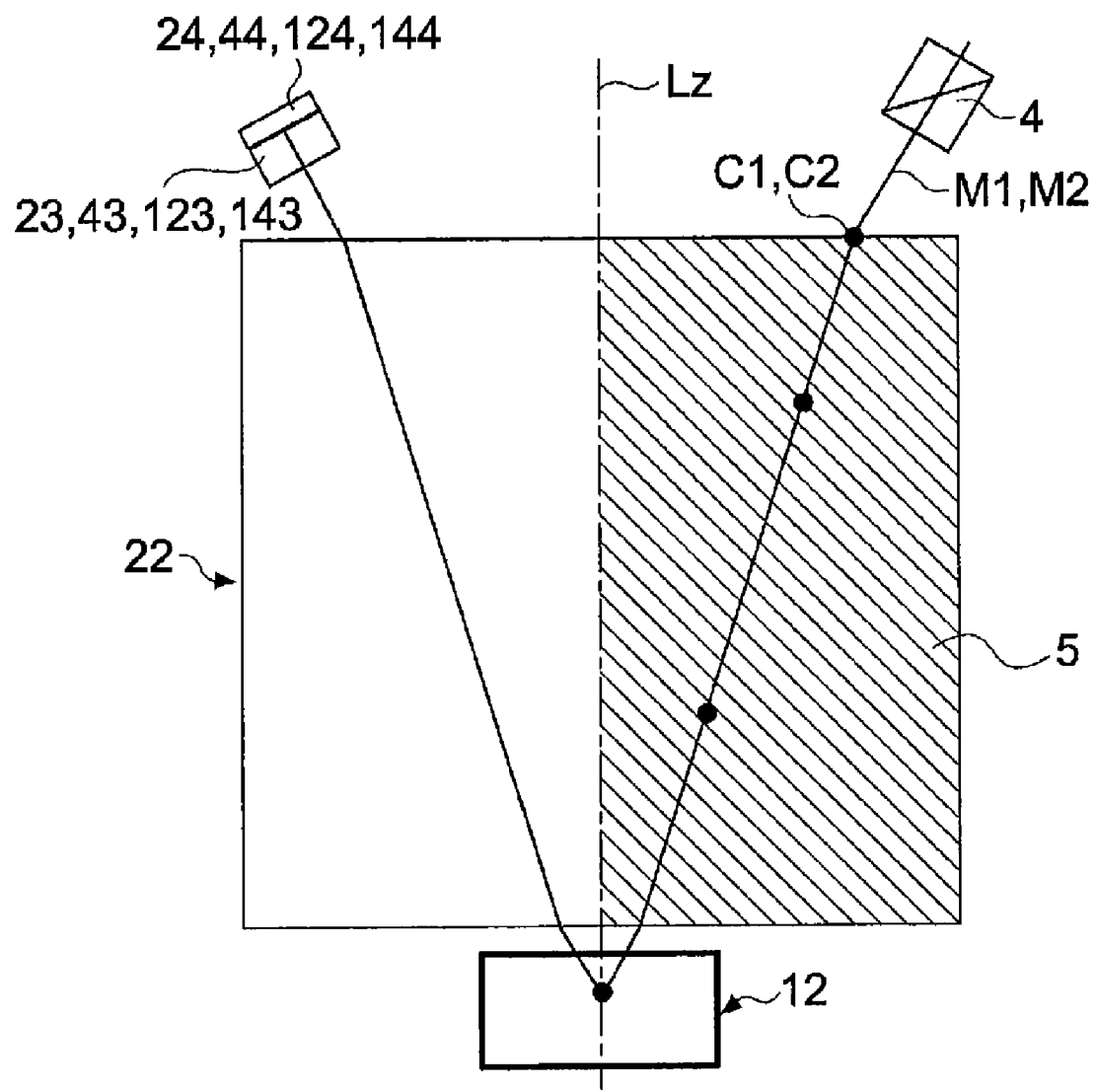
FIG. 7 is a side view of the main PBS illustrated in FIG. 5 viewed from direction W2.
Figure 7:
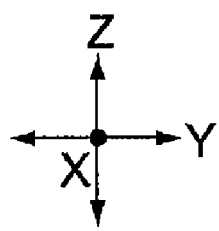

FIG. 4 is a perspective view illustrating the structure of the main PBS 22. FIG. 5 is a plan view of the main PBS 22 illustrated in FIG. 4. FIG. 6 is a side view of the main PBS 22 illustrated in FIG. 5 viewed from a direction W1. FIG. 7 is a side view of the main PBS 22 illustrated in FIG. 5 viewed from a direction W2.

The main PBS 22 is, for example, a cube, and includes a polarizing and splitting surface 5 for polarizing and splitting beam on a plane 89 that passes through a center line Lz in the z-axis direction, which is the longitudinal direction, and that is parallel to the yz plane (hereinafter plane 89 is referred to as a center yz plane 89). More specifically, the polarizing and splitting surface 5 is formed on half of the center yz plane 89. For example, the main PBS 22 may be formed by attaching two blocks, one on the forward side and the other in the backside of the center yz plane 89 in the x-axis direction. It is also possible to form the main PBS 22 by combining smaller blocks. The polarizing and splitting surface 5 can be produced by employing, for example, methods of depositing and applying resin and metal films.

In the main PBS 22, the transmissive area that is the entire area except the polarizing and splitting surface 5 and is constituted of, for example, glass. In this case, it is desirable that glass having an absolute value of an expansion coefficient of $1 \times 10^{-6}$ or smaller is used. By using glass having such a small expansion coefficient, the main PBS 22 will be less likely to be affected by a temperature change in the environment.

Figure 8:
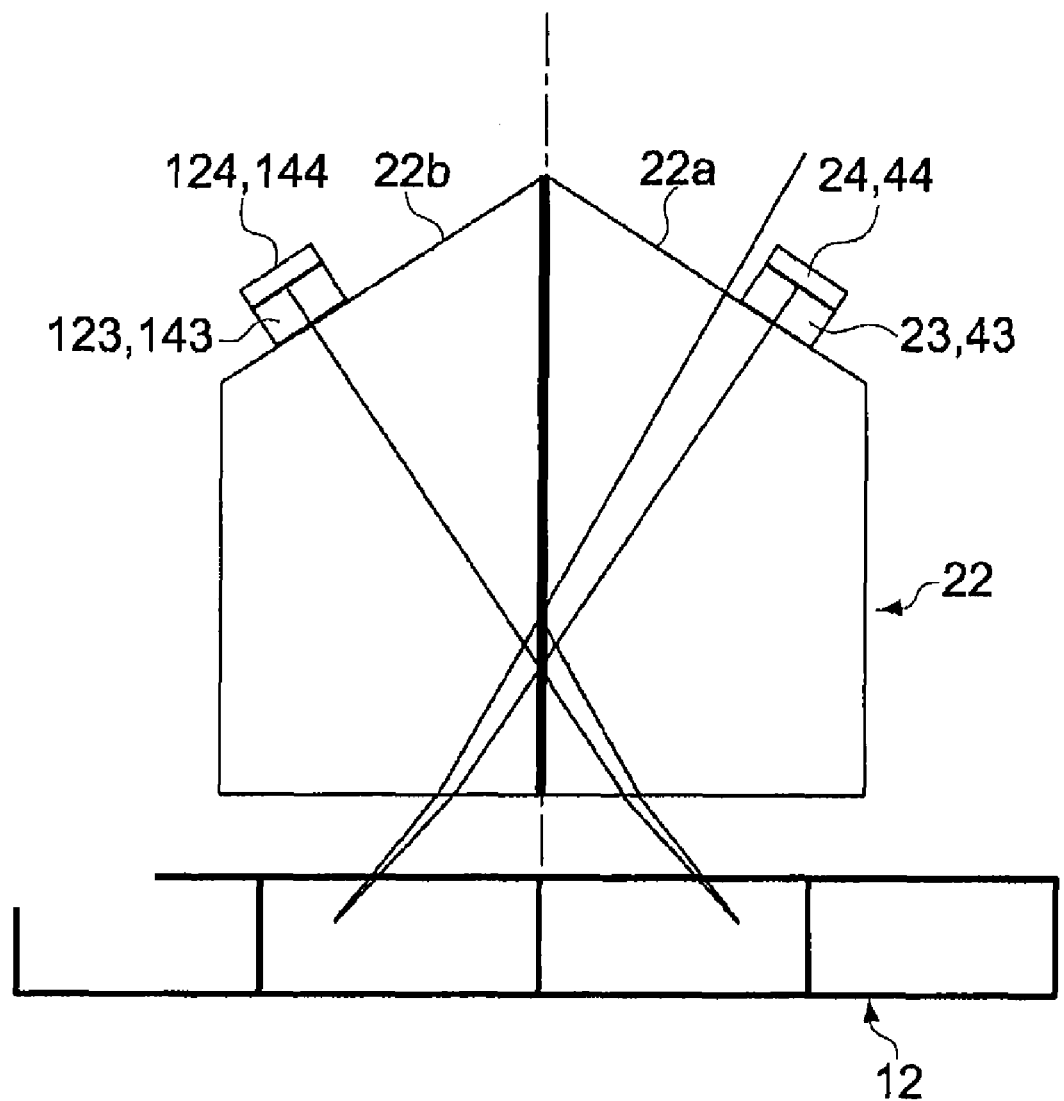
Figure 8:
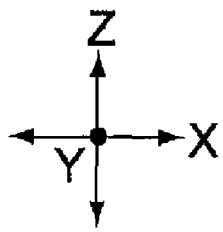

FIG. 8 is a side view illustrating, in detail, the positions of the main PBS 22, the first quarter wavelength plate 23, and so on and is, for example, viewed from the direction W1 in FIG. 5. For example, the main PBS 22 may include inclined surfaces 22a and 22b at the upper area. The first and third quarter wavelength plates 23 and 43 may be disposed on the inclined surface 22a, and the mirrors 24 and 44 may be disposed on the first and third quarter wavelength plates 23 and 43, respectively. The inclined surface 22a and the first and third quarter wavelength plates 23 and 43 can be bonded together with an adhesive or by welding, ultrasound bonding, or laser bonding.

The first and third quarter wavelength plates 23 and 43 and the mirrors 24 and 44 can be bonded by employing the same methods. The second and fourth quarter wavelength plates 123 and 143 and the mirrors 124 and 144 disposed on the inclined surface 22b can also be bonded by employing the same methods. In this way, the main PBS 22 and the quarter wavelength plate 23, 123, 43, and 143 and the mirrors 24, 44, 124, and 144 are formed into a unit.

The angle of the inclined surface 22a is set so that a beam is incident on the polarizing and splitting surface 5 at a predetermined angle, so that the beam is reflected at the first quarter wavelength plate 23 and the mirror 24 at a predetermined angle, and so that the beam enters the diffraction grating 12 at a predetermined angle.

Next, the operation of the first phase detecting unit 10 will be described. The light source 20 emits a laser beam to the first lens 21. The first lens 21 gathers the incident beam to a certain diameter, and emits the gathered laser beam to the first BS 4. The first BS 4 splits the gathered laser beam into two laser beams, i.e., a first laser beam M1 and a second laser beam M2, collimates the two laser beams M1 and M2, and emits the laser beams M1 and M2 to the main PBS 22. As in FIGS. 5 and 6, the incident positions of the laser beams M1 and M2 that are incident on the upper surface of the main PBS 22 at an angle are represented by points C1 and C2.

At the polarizing and splitting surface 5 of the main PBS 22, the incident first laser beam M1 is split into a beam having a P-polarized component and a beam having an S-polarized component. At this time, the beam having a P-polarized component is transmitted through the polarizing and splitting surface 5, whereas the beam having an S-polarized component is reflected at the polarizing and splitting surface 5. In the main PBS 22, the beam having a P-polarized component is incident on the point P1 and the beam having an S-polarized component is incident on the point P2 so that the optical path to the point P1 of the first area A1 of the diffraction grating 12 and the optical path to the point P2 of the first area A2 are centrosymmetric. Similarly, the main PBS 22 splits the incident second laser beam M2 into a beam having a P-polarized component and a beam having an S-polarized component. In the main PBS 22, the beam having a P-polarized component is incident on the point P1 and the beam having an S-polarized component is incident on the point P2 so that the optical path to the point Q1 of the second area B1 of the diffraction grating 12 and the optical path to the point P2 of the first area A2 are centrosymmetric.

If the beam from the light source 20 is linearly polarized, the polarization direction is tilted by 45° before the beam is incident on the main PBS 22. In this way, the intensities of the beam having a P-polarized component and the beam having an S-polarized component can be made equal.

The beam incident on the points P1 and P2 (hereinafter may be collectively referred to as a point P) and the points Q1 and Q2 (hereinafter may be collectively referred to as a point Q) are diffracted to directions determined by the Bragg condition, shown below:

$$\sin \theta_1 + \sin \theta_2 = n \cdot \lambda / \Lambda$$

where $\theta_1$ represents the incident angle to the diffraction grating 12, $\theta_2$ represents the diffraction angle from the diffraction grating 12, $\Lambda$ represents the pitch (width) of the grating, $\lambda$ represents the wavelength of light, and n represents the order of diffraction.

The displacement detection apparatus 1 according to an embodiment is set so that $\theta_{1p}=\theta_{1q}$ and $\theta_{2p}=\theta_{2q}$, where the incident angle to the points P is $\theta_{1p}$, the diffraction angle from the point P is $\theta_{2p}$, the incident angle to the points Q is $\theta_{1q}$, and the diffraction angle from the point Q is $\theta_{2q}$. The order of diffraction is the same at the points P and Q, where the order of diffraction for the displacement detection apparatus 1 is the first order.

With the displacement detection apparatus 1 according to an embodiment, the entire optical system is set so that the incident angle $\theta_{1p}$ (or $\theta_{1q}$) of the polarized beam at the diffraction grating 12 and the diffraction angle $\theta_{2p}$ (or $\theta_{2q}$) are substantially equal. In this way, even when the relative positions of the diffraction grating 12 and the main PBS 22 are displaced in the z-axis direction, the entire optical system is not affected. Thus, the position of the main PBS 22 in the z direction does not have to be maintained at high accuracy.

The beam diffracted at the point P1 is passes through the first quarter wavelength plate 23 and is reflected orthogonally at the mirror 24. In other words, the mirror 24 guides the beam to the first quarter wavelength plate 23 again, and the first quarter wavelength plate 23 emits the beam toward the point P1 of the diffraction grating 12. The diffraction grating 12 diffracts the return beam from the first quarter wavelength plate 23 again at the point P1 and guides the beam to the main PBS 22. Since the optical axis of the first quarter wavelength plate 23 is tilted by 45° with respect to the polarization direction of the incident beam, the beam returned to the point P1 is a beam having an S-polarized component. More specifically, the first quarter wavelength plate 23 is a polarization altering element configured to alter the polarization state of the beam. According to an embodiment, since the beam passes through the first quarter wavelength plate 23 twice, the beam having a P-polarized component is altered into a beam having an S-polarized component.

The beam diffracted at the point Q1, similar to the beam diffracted at the point P1, passes through the third quarter wavelength plate 43, is reflected orthogonally at the mirror 44, passes through the third quarter wavelength plate 43 again, and returns to the point Q1 in the diffraction grating 12. The return beam is diffracted at the point Q1 and is guided to the main PBS 22 again. In a manner similar to that described above, since the beam passes through the third quarter wavelength plate 43 twice, the beam having a P-polarized component is altered into a beam having an S-polarized component.

The beam diffracted at the point P2 passes through the second quarter wavelength plate 123, is reflected orthogonally at the mirror 124, passes through the second quarter wavelength plate 123 again, and returns to the point P2 in the diffraction grating 12. Since the beam passes through the second quarter wavelength plate 123 twice, the beam having an S-polarized component is altered into a beam having a P-polarized component.

The beam diffracted at the point Q2, similar to the beam diffracted at the point P2, passes through the fourth quarter wavelength plate 143, is reflected orthogonally at the mirror 144, passes through the fourth quarter wavelength plate 143 again, returns to the point Q2 in the diffraction grating 12. The return beam is diffracted and is guided to the main PBS 22. Since the beam passes through the fourth quarter wavelength plate 143 twice, the beam having an S-polarized component is altered into a beam having a P-polarized component.

Since the return beam from the point P1 has an S-polarized component, it passes through the polarizing and splitting surface 5 of the main PBS 22. Since the returned from the point P2 has a P-polarized component, it is reflected at the polarizing and splitting surface 5. Therefore, the return beams from the points P1 and P2 are combined at the polarizing and splitting surface 5 and are incident on the second lens 26.

Similarly, the return beams from the points Q1 and Q2 are combined at the polarizing and splitting surface 5 and are incident on the third lens 46.

Next, the relationship between the optical path length from the main PBS 22 to the first quarter wavelength plate 23 via the point P1 and the optical path length from the main PBS 22 to the second quarter wavelength plate 123 via the point P2 will be described.

In the displacement detection apparatus 1, the optical path from the main PBS 22 to the first quarter wavelength plate 23 via the points P and the optical path from the main PBS 22 to the second quarter wavelength plate 123 via the points Q are symmetrical with respect to a center line (perpendicular) Lz that center point J of the points P1 and P2 on the diffraction grating 12.

According to an embodiment, to prevent error caused by fluctuation in the wavelength of the light source 20, the length of the optical path of the beam having a P-polarized component split at the main PBS 22 reaching the first quarter wavelength plate 23 via the point P1 and the length of the optical path of the beam having an S-polarized component split at the main PBS 22 reaching the second quarter wavelength plate 123 via the point P2 are adjusted to be equal. The accuracy of this adjustment depends on the required length measurement accuracy and the temperature of the environment of the displacement detection apparatus 1. The optical-path length difference $\Delta L$ should satisfy the following equation:

$$\Delta E > \Delta\lambda/\lambda 2 \times 2 \times \Delta L \times \Lambda/4$$

where $\Delta E$ represents the required length measurement accuracy, $\Lambda$ represents the pitch of the diffraction grating, $\lambda$ represents the wavelength of the light source, and $\Delta\lambda$ represents the change of the wavelength caused by a temperature change.

For example, if the temperature change of the use environment is 10° C., the fluctuation in the wavelength of a standard 780-nm semiconductor laser is about 3 nm. Therefore, if $\Lambda=0.05$ μm and $\Delta E=0.1$ μm, $\Delta L$ should be adjusted so that $\Delta L<74$ μm. To adjust $\Delta L$, a light source having a desired coherence length may be used.

In general, the visibility representing the degree of modulation of the interference pattern of an interferometer is determined by the coherence of the light source and the difference of the optical path lengths of two interfering beams. For a light source having good coherence such as a laser device capable of single-mode oscillation, the visibility is not lost even when the difference of the optical path lengths is great. In contrast, for a light source have bad coherence, the visibility of the interference pattern changes according to the change in the difference of the optical path lengths.

By using such a light source, the difference in the optical path lengths can be detected as a decrease in the degree of modulation (visibility) of the interference signal. Thus, by maximizing the degree of modulation of the interference signal, the optical paths can be set to equal lengths. For example, by using a semiconductor laser device capable of multi-mode oscillation whose coherence length is about 200 μm, the optical-path length difference can be easily set to satisfy $\Delta L<74$ μm.

For the light source 20, a light source with a limited coherence length, as described above, only when adjustment is carried out may be used. Then, after adjustment is carried out, the light source may be replaced with a more inexpensive light source having a large coherence length (such as a standard semiconductor laser device capable of single-mode oscillation).

The relationship between the optical path length from the main PBS 22 to the third quarter wavelength plate 43 via the point Q1 and the optical path length from the main PBS 22 to the fourth quarter wavelength plate 143 via the point Q2 is the same as that for the above-described case in which light is diffracted at the points P.

The second lens 26 gathers the incident beam to a certain diameter, and emits the gathered laser beam to the BS 27. As described below, the BS 27 splits the incident beam so as to generate signals (a sin signal and a cos signal) having phases different from each other by 90° at the first and second differential amplifiers 35 and 36, respectively. The BS 27 emits one of the split beams to the second PBS 28 and emits the other split beam to the fifth quarter wavelength plate 31. Since the beam having a P-polarized component and the beam having an S-polarized component emitted from the second BS 27 do not interfere with each other, the second PBS 28 is disposed so that the polarization direction of the incident beam is tilted by 45°. In this way, the beams interfere with each other. The second PBS 28 splits the interfering beams in a manner such that the interfering beam having an S-polarized component is reflected and the interfering beam having a P-polarized component is transmitted. The reflected interfering beam having an S-polarized component is incident on the first photoelectric converter 29, and the transmitted interfering beam having a P-polarized component is incident on the second photoelectric converter 30. At the first photoelectric converter 29, a signal having a phase different by 180° from that of the second photoelectric converter 30 is obtained.

At the first photoelectric converter 29 and the second photoelectric converter 30, an $A \cos(4Kx+\delta)$ interference signal is obtained. K represents wavenumber and is equal to $2\pi/\Lambda$; x represents movement (i.e., the movement of the diffraction grating 12); and $\delta$ represents the initial phase. The movement x is multiplied by 4K because four waves (four dark and bright beams of light) are obtained for each pitch of the diffraction grating (for each 1$\Lambda$) at the first photoelectric converter 29 (or the second photoelectric converter 30) as the diffraction grating 12 moves in the x direction. One of the beams split at the main PBS 22 is diffracted twice (2K) at the diffraction grating 12, and the other beam split at the main PBS 22 is also diffracted twice (2K) at the diffraction grating 12, resulting in 2K+2K=4K. In other words, when the movement equals x, a phase component that equals 4Kx is detected. In this way, high-resolution displacement detection is possible.

The fifth quarter wavelength plate 31, similar to the second PBS 28, is disposed so that the polarization direction of the incident beam is tilted by 45° so as to obtain an interference beam of a beam having a P-polarized component and a beam having an S-polarized component. When the beams incident on the fifth quarter wavelength plate 31, the beam having a P-polarized component and the beam having an S-polarized component are circularly-polarized in opposite directions to each other, combined into a linearly polarized beam, and is incident on the third PBS 32. The linearly polarized beam incident on the third PBS 32 is split into a beam having an S-polarized component and a beam having a P-polarized component, in a manner similar to the case of the second PBS 28. The beam having an S-polarized component is incident on the third photoelectric converter 33, and the beam having a P-polarized component is incident on the fourth photoelectric converter 34. The polarization direction of the linearly polarized beam incident on the third PBS 32 is rotated once when the diffraction grating moves in the x direction by $\Lambda/2$. Thus, the third photoelectric converter 33 and the fourth photoelectric converter 34 are capable of obtaining an interference signal A cos(4Kx+δ'), in a manner similar as the first photoelectric converter 29 and the second photoelectric converter 30.

The third photoelectric converter 33 obtains a signal having a phase different by 180° from that of the fourth photoelectric converter 34. The third PBS 32 is tilted by 45° with respect to the second PBS 28. Therefore, the signals obtained at the third photoelectric converter 33 and the fourth photoelectric converter 34 have a phase different by 90° from that of the signals obtained at the first photoelectric converter 29 and the second photoelectric converter 30. More specifically, a sin signal and a cos signal are obtained at the first photoelectric converter 29 and the second photoelectric converter 30, respectively. A Lissajous signal can be generated from these signal, as described below, and the movement of the diffraction grating 12 in the x direction can be determined as a positive (+) or negative (−) movement.

The first differential amplifier 35 differentially amplifies electric signals input from the first photoelectric converter 29 and the second photoelectric converter 30, and outputs a signal obtained by canceling out the direct current (DC) component of the interference signal to the incremental-signal generator 13 and the first phase detector 14. Similarly, the second differential amplifier 36 differentially amplifies electric signals input from the third photoelectric converter 33 and the fourth photoelectric converter 34, and outputs a signal obtained by canceling out the direct current (DC) component of the interference signal to the incremental-signal generator 13 and the first phase detector 14.

Figure 9:
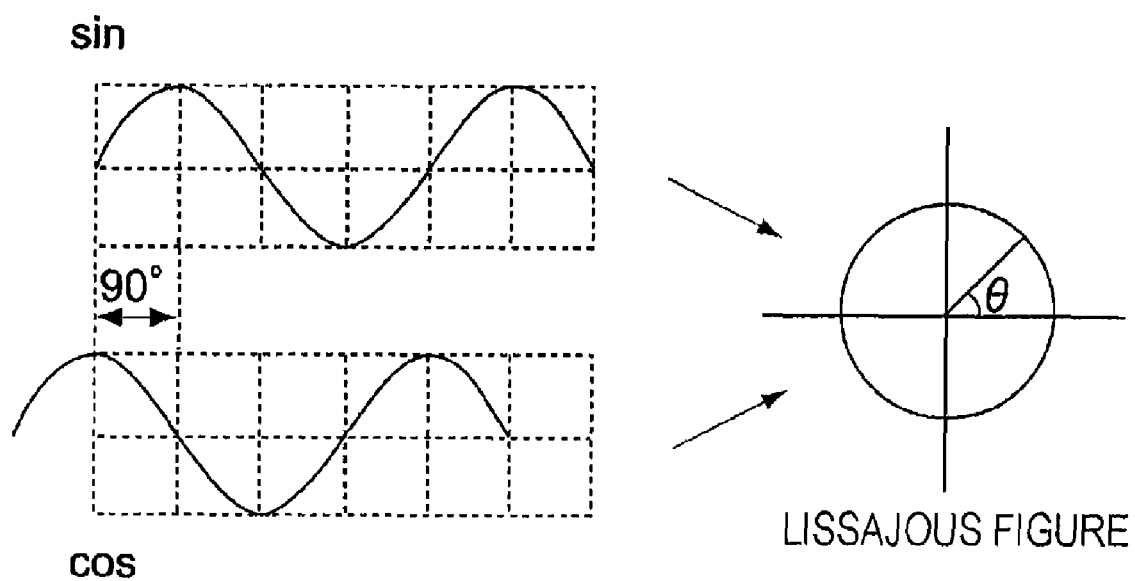
FIG. 9 illustrates the angle of a Lissajous signal.

The incremental-signal generator 13 determines the displacement direction and displacement amount of the diffraction grating 12 on the basis of the signals supplied from the first differential amplifier 35 and the second differential amplifier 36. The first phase detector 14 determines an angle θa of the Lissajous signal, as shown in FIG. 9, on the basis of the signals supplied from the first differential amplifier 35 and the second differential amplifier 36. The first phase detector 14 supplies the determined angle θa to the phase comparator 16.

the operation of the second light-receiving processing system 38 of the second phase detecting unit 11 is the same as the above-described operation of the first light-reception processing system 37. More specifically, the second light-receiving processing system 38 determines the angle θb of the Lissajous signal on the basis of the signals supplied from the first differential amplifier 55 and the second differential amplifier 56. The second phase detector 15 supplies the determined angle θb to the phase comparator 16.

Now, the operation of the phase comparator 16 will be described. At the first phase detector 14, the angle θa of the Lissajous signal rotates once when the diffraction grating 12 is displaced by Λ/4 in a predetermined measurement direction. At the second phase detector 15, the angle θb of the Lissajous signal rotates once when the diffraction grating 12 is displaced by (Λ+Λ/n)/4 in a predetermined measurement direction.

The phase comparator 16 determines the difference Δθ between the angle θa of the Lissajous signal from the first phase detector 14 and the angle θb of the Lissajous signal from the second phase detector 15 (Δθ=θa−θb). The difference Δθ changes according to the displacement of the diffraction grating 12, and when the diffraction grating 12 is displaced by Λ(1+n)/4 in a predetermined measurement direction, the difference Δθ returns to the original value.

The phase comparator 16 outputs the difference Δθ to the pulsed signal generator 17. The pulsed signal generator 17 outputs a pulsed signal when the difference Δθ from the phase comparator 16 equals a predetermined value Δθc. For example, when the difference Δθ returns to the same value every Λ(1+n)/4 in a predetermined measurement direction of the diffraction grating 12, the pulsed signal generator 17 generates a pulsed signal every Λ(1+n)/4.

The pulsed signal generator 17 can set the value Δθc (herein after referred to a set value) to a desired value. For example, when the set value is set to zero degrees, which can be easily detected, the pulsed signal generator 17 generates a pulsed signal when the difference Δθ from the phase comparator 16 equals zero degrees.

The pulsed signal generator 17 generates a pulsed signal at predetermined intervals is the intervals of the optical section of the first phase detecting unit 10 and the optical section of the second phase detecting unit 11 do not change. Therefore, in this case, the pulsed signal can be used as an origin signal. By using such origin signals, the incremental-signal generator 13 may be operated. The generation interval of the origin signals can be set to a desired value according to the difference Λ/n between the grating pitch of the diffraction grating recorded in the first areas A and the grating pitch of the diffraction grating recorded in the second areas B.

Next, the resolution of a pulsed signal generated at the pulsed signal generator 17 will be described. When a pulsed signal is used as an origin signal, the longer the cycle is, the higher the resolution is. Thus, the greater n is, the easier it is to detect the origin point even when the accuracy of the mechanism is not high.

However, since the phase difference is only Λ/4n at the point where the Lissajous signal is rotated once from the point where the two phase differences match, the position may be falsely detected by Λ/4 unless the matching of the phase differences is detected more accurately than Λ/4n. Since the level of resolution for detecting the two phase differences depends on the accuracy of reading the two phase differences and signal-to-noise ratio (S/N), the magnitude of n is limited.

For example, when the grating pitch Λ is set to 0.55 µm and n is set to 100, the repeated origin appears about every 13.9 µm. At this time, the required resolution is Λ/4n, where n equals to at least 200 to 400, but the higher the resolution is, the higher the accuracy is. For example, when n=100, the phase difference only equals to 2π/100 even when the Λ/4 position changes. Therefore, the distance in which the phase difference is included in the width of the resolution is Λ/4. To reduce this distance, the resolution must be increased. When the n=1,000, the distance is Λ/(4×10).

However, it is not easy to increase the resolution since S/N becomes a problem. Therefore, it is effective to select one wavelength (Λ/4) of signals by using the signals whose matching of phase differences are to be detected as a gate and generate an origin signal when the phase of one of the predetermined Λ/4 signals equals a predetermined phase. In this way, the accuracy of the origin and the resolution can be increased to the same level as the phase-difference detection resolution. According to an embodiment, the accuracy of the origin can be increased to about 0.3 to 0.7 nm.

The set value of the pulsed signal generator 17 may be changed by the user after the displacement detection apparatus 1 is attached to the object to be measured. In such a case, at the initial setting, the set value is set to an arbitrary value, and then a program for changing the set value is distributed in response to an inquiry made by the user.

The pulsed signal generator 17 may count the number of time the difference Δθ input from the phase comparator 16 equals the set value and may generate a pulsed signal when the counted number equals a predetermined number.

After the difference Δθ equals the set value, the pulsed signal generator 17 may generate an origin signal when the angle θa of the Lissajous signal generated at the first phase detector 14 (hereinafter, simply referred to as the "angle θa") and the angle θb of the Lissajous signal generated at the second phase detector 15 (hereinafter, simply referred to as the "angle θb") reach a predetermined angle θn. Furthermore, after the difference Δθ equals the set value, the pulsed signal generator 17 may generate an origin signal when, after the angle θa or θb reaches the predetermined angle θn, the angle θa or θb reaches the predetermined angle θn for the second time at a position a predetermined distance away from that of the first time. The predetermined distance equals $(2n+1)\Lambda/2$, where n represents an integer greater than or equal to zero and Λ represents the pitch of the diffraction grating recorded in the first areas A when the pulsed signal generator 17 uses the first areas A of the diffraction grating 12 to generate an origin signal and represents the pitch of the diffraction grating recorded in the second areas B when he pulsed signal generator 17 uses the second areas B of the diffraction grating 12 to generate an origin signal.

The angle θn of the pulsed signal generator 17 may be changed by the user after the displacement detection apparatus 1 is attached to the object to be measured. In such a case, at the initial setting, the angle θn is set to an arbitrary value, and then a program for changing the angle θn is distributed in response to an inquiry made by the user.

As described above, with this embodiment, since a reflective diffraction grating is used as the diffraction grating 12, the diffracted beams generated at the diffraction grating 12 can be reflected, the size of the displacement detection apparatus 1 can be reduced. Furthermore, since the quarter wavelength plates 23, 43, 123, and 143, the mirrors 24, 44, 124, and 144, and so on are provided as a unit with the main PBS 22, the assembly accuracy can be maintained at a high level, and the reliability of the displacement detection apparatus 1 can be maintained.

In this way, to reduce the size by using a reflective diffraction grating 12 and to provide the quarter wavelength plates as a unit with the main PBS 22, the main PBS 22 includes a beam transmitting area in addition to the polarizing and splitting surface 5. In this way, the main PBS 22 is formed as a block, and the quarter wavelength plates and the mirrors can be provided as a unit with the PBS.

With the displacement detection apparatus 1 according to an embodiment, beams are incident, in a centrosymmetrical manner, on the first phase detecting unit 10 and the second phase detecting unit 11 so that the diffraction points of the incident beams are aligned on an inner line (i.e., aligned on the line L1) on the diffraction grating 12 having the first areas A where the diffraction grating recorded with a pitch Λ formed on one side in the measurement direction and the second areas B where the diffraction grating recorded with a pitch Λ+Λ/n formed on the other side in the measurement direction. The beams diffracted at the diffraction grating 12 interfere. The phase differences are detected by the first phase detector 14 and the second phase detector 15 from the interference beams, and, then, the difference of the phase differences is detected at the phase comparator 16. When the difference equals a predetermined value, a pulsed signal is generated at the pulsed signal generator 17. In this way, an incremental signal is detected by the incremental-signal generator 13, and, at the same time, an accurate origin signal is generated at the pulsed signal generator 17.

According to the displacement detection apparatus 1, since the optical-path length difference of the beams to be interfered are set the same by using the first phase detecting unit 10 and the second phase detecting unit 11 that form centrosymmetric optical paths, even when the diffraction grating 12 moves in the z-axis direction or when the wavelength of the light source fluctuates due to the outside temperature. Thus, a stable origin signal can be obtained.

According to the displacement detection apparatus 1, since the first phase detecting unit 10 and the second phase detecting unit 11 that are grating interferometers are used, the grating pitch of the diffraction grating 12 recorded on the first areas A1 and A2 and the second areas B1 and B2 constituting the diffraction grating 12 can be reduced. For example, whet the grating pitch is set to 0.55 μm, the signal for detecting a phase has a cycle of 0.1379 . . . μm (≈138 nm). Accordingly, a phase difference can be detected at a high accuracy, and an origin signal on the order of nanometers can be obtained.

Optical fibers may be connected between the light source 20 of the first phase detecting unit 10 and the first lens 21, between the second lens 26 and the BS 27, and/or between the third lens 46 and the BS 47.

Optical fibers may be connected between the second PBS 28 and the first photoelectric converter 29, between the second PBS 28 and the second photoelectric converter 30, between the third PBS 32 and the third photoelectric converter 33, between the third PBS 32 and the fourth photoelectric converter 34, between the second PBS 48 and the first photoelectric converter 49, between the second PBS 48 and the second photoelectric converter 50, between the third PBS 52 and the third photoelectric converter 53, and/or between the third PBS 52 and the fourth photoelectric converter 54.

To collect the beam output from the second PBS 28 and input the beam to an optical finer, a collecting lens may be interposed between the first photoelectric converter 29 and the second photoelectric converter 30; to collect the beam output from the third PBS 32 and input the beam to an optical finer, a collecting lens may be interposed between the third photoelectric converter 33 and the fourth photoelectric converter 34; to collect the beam output from the second PBS 48 and input the beam to an optical finer, a collecting lens may be interposed between the first photoelectric converter 49 and the second photoelectric converter 50; and/or to collect the beam output from the third PBS 52 and input the beam to an optical finer, a collecting lens may be interposed between the third photoelectric converter 53 and the fourth photoelectric converter 54.

According to such a structure of the displacement detection apparatus 1, since a heat source can be disposed away from the diffraction grating 12, phase detection can be carried out more stably. By temperature controlling the wavelength of the beam emitted from the light source 20, the wavelength can be fixed to a constant wavelength. Moreover, by disposing the light source 20 outside the displacement detection apparatus 1, the light source 20 can be easily replaced when damaged.

According to the displacement detection apparatus 1, the degree of modulation for when interference beams are interfered can be detected at the first phase detecting unit 10 and the second phase detecting unit 11, and, on the basis of the detection result, the difference of the optical path lengths can be monitored. As a result of the monitoring, when it is detected that there is a difference between the optical path lengths, the optical path lengths can be adjusted to the same lengths.

Figure 10:
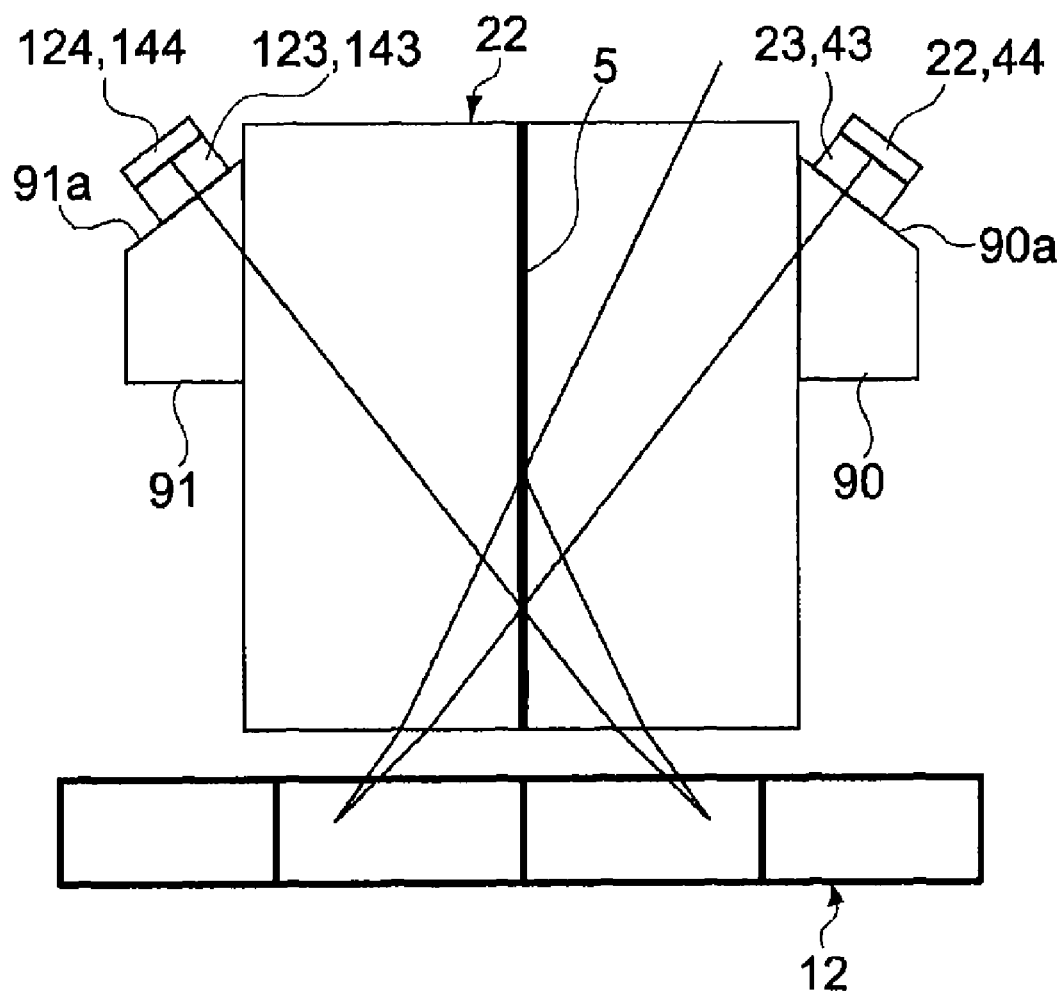
FIG. 10 is a side view of a main PBS and so on according to another embodiment.

FIG. 10 is a side view illustrating a main PBS 22 according to another embodiment of the present invention. According to an embodiment, instead disposing, for example, as shown in FIG. 8, the first quarter wavelength plate 23, the mirror 24, and so on the inclined surfaces 22a and 22b at the upper part of the main PBS 22, the first quarter wavelength plate 23, the mirror 24, and so on are disposed on suitable prisms 90 and 91 and then disposed on the sides of the main PBS 22. More specifically, the upper parts of the prisms 90 and 91 have inclined surfaces 90a and 91a, respectively. The quarter wavelength plates 23 and 43 are disposed on the inclined surface 90a, whereas the quarter wavelength plates 123 and 143 are disposed on the inclined surface 91a. By employing such a configuration, the first quarter wavelength plate 23, the mirror 24, and so on can be provided as a unit with the main PBS 22.

As a configuration in which two prisms are provided, two quarter wavelength plates 23 and 43 (two quarter wavelength plates 123 and 143) are disposed on one prism 90 (91). However, instead, a total of four prisms may be provided, wherein two prisms are provided in the direction perpendicular to the page surface of FIG. 10. In such a case, the quarter wavelength plate 23, 43, 123, and 143 are each provided on each of the fourth prisms.

Figure 16:
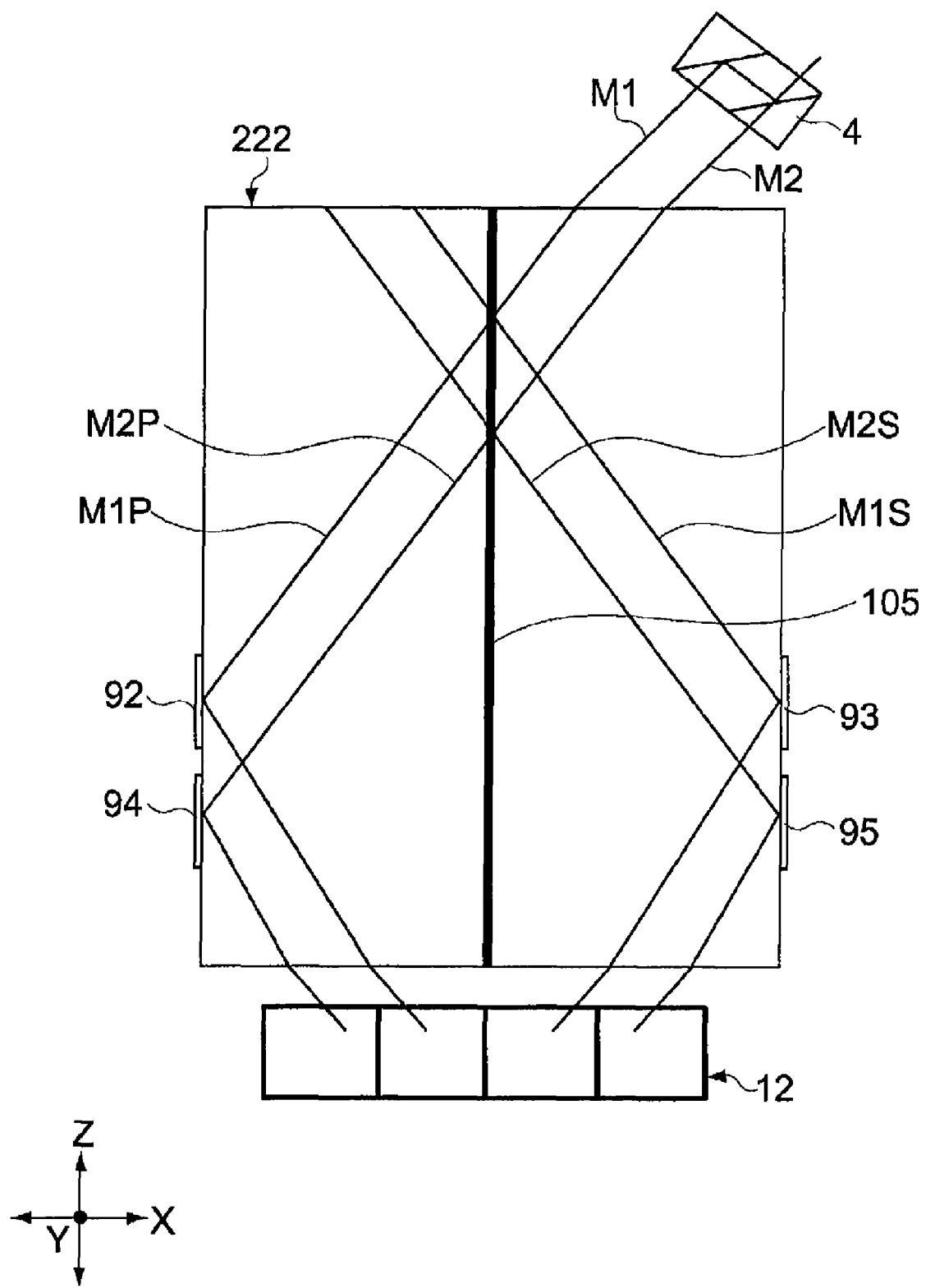
FIG. 16 is a side view illustrating a main PBS according to another embodiment.

FIG. 16 is a side view illustrating a main PBS 222 according to another embodiment. The main PBS 222 corresponds to FIG. 6. A laser beam M1 is polarized and split at a polarizing and splitting surface 105 at the center of the main PBS 222, and, as a result, a polarized beam $M1_P$ having a P-polarized component and a polarized beam $M1_S$ having an S-polarized component are generated. Similarly, a laser beam M2 is polarized and split at a polarizing and splitting surface 105, and, as a result, a polarized beam $M2_P$ having a P-polarized component and a polarized beam $M2_S$ having an S-polarized component are generated.

The polarized beam $M1_P$ and the polarized beam $M1_S$ move away from each other from the polarizing and splitting surface 105. Then, the polarized beam $M1_P$ and the polarized beam $M1_S$ are reflected mirrors 92 and 93, respectively, are emitted from the main PBS 222 as they move closer to each other, and are incident on a diffraction grating 12. The polarized beam $M2_P$ and the polarized beam $M2_S$ are reflected mirrors 94 and 95, respectively, are emitted from the main PBS 222 as they move closer to each other, and are incident on a diffraction grating 12.

According to such a configuration of the main PBS 222, since the polarized beams $M1_P$ and $M1_S$ ($M2_P$ and $M2_S$) are incident on the diffraction grating 12 as they move closer to each other as much as possible, the effect of distortion caused by the diffraction grating 12 can be suppressed. More specifically, if the two polarized beams are incident on the diffraction grating 12 at positions far apart from each other when swell or distortion is generated at the surface (i.e., the incident surface of the beams) of the diffraction grating 12, the optical paths of the two polarized beams may be equal each other. However, according to the configuration illustrated in FIG. 16, the polarized beams are not affected even when swell or distortion is generated at the surface of the diffraction grating 12.

Instead of providing the mirrors 92 to 95, the angles of the polarized beams $M1_P$, $M1_S$, $M2_P$, and $M2_S$ may be set so that the polarized beams $M1_P$, $M1_S$, $M2_P$, and $M2_S$ are transmitted through the transmissive area (the area expecting the polarizing and splitting surface 105) of the main PBS 222 at angles that cause the polarized beams $M1_P$, $M1_S$, $M2_P$, and $M2_S$ to be totally reflected at the side surfaces of the main PBS 222.

Figure 11:
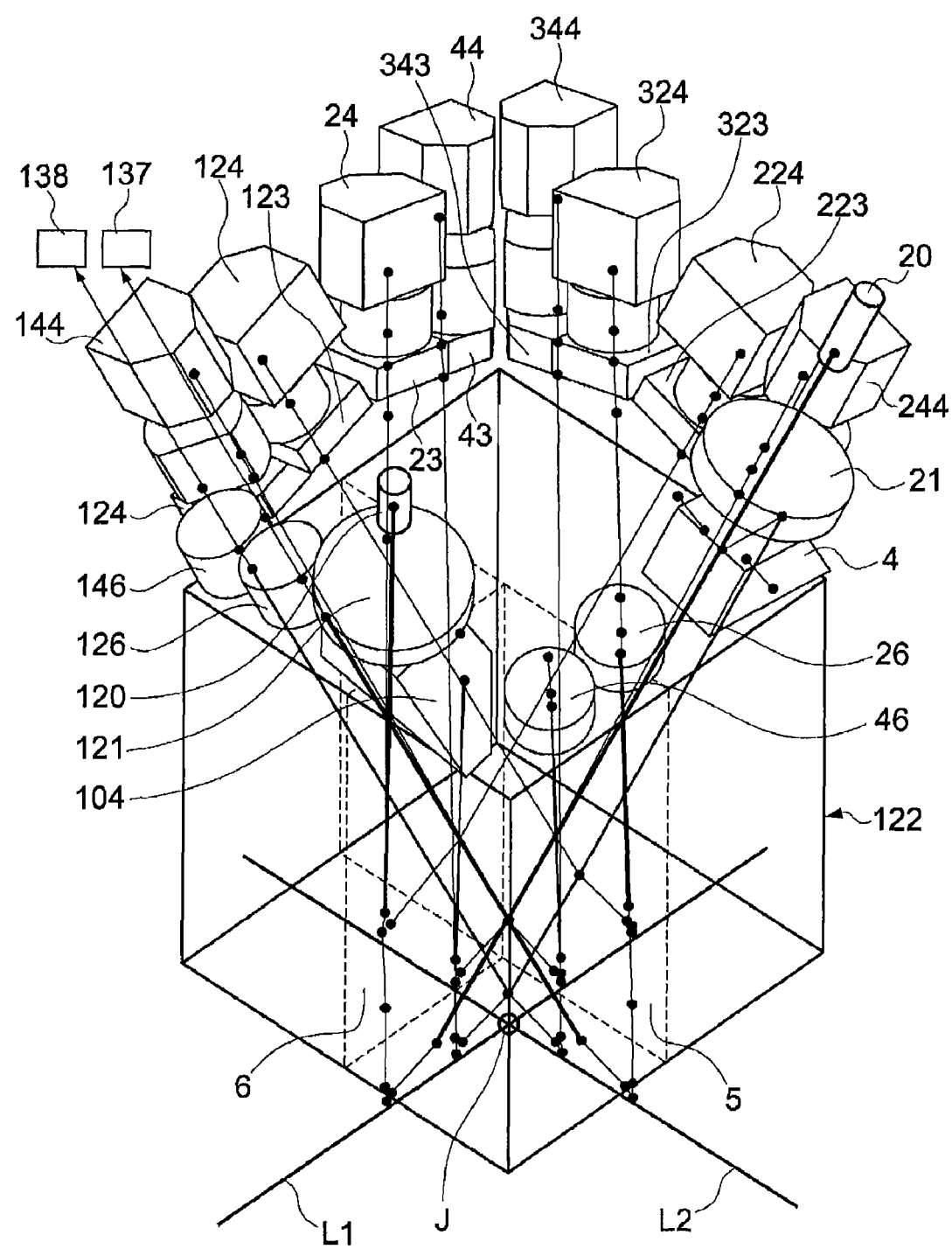
FIG. 11 is a perspective view of an optical system of a displacement detection apparatus according to another embodiment.

FIG. 11 is perspective view of an optical system of a displacement detection apparatus according to another embodiment of the present invention. In the following description, components and functions that are the same as those of the displacement detection apparatus 1 according to the above-described embodiments illustrated in FIGS. 1 and 2 will be simplified or omitted, and components and functions that differ from those will be mainly described.

With the displacement detection apparatus 1 according to an above-described embodiment, a one-dimensional diffraction grating 12 having a measurement line only in the x-axis direction is used. With a displacement detection apparatus 2 according to the embodiment illustrated in FIG. 11, a two-dimensional diffraction grating 112 having measurement lines in the x-axis and y-axis directions is used.

Figure 12:
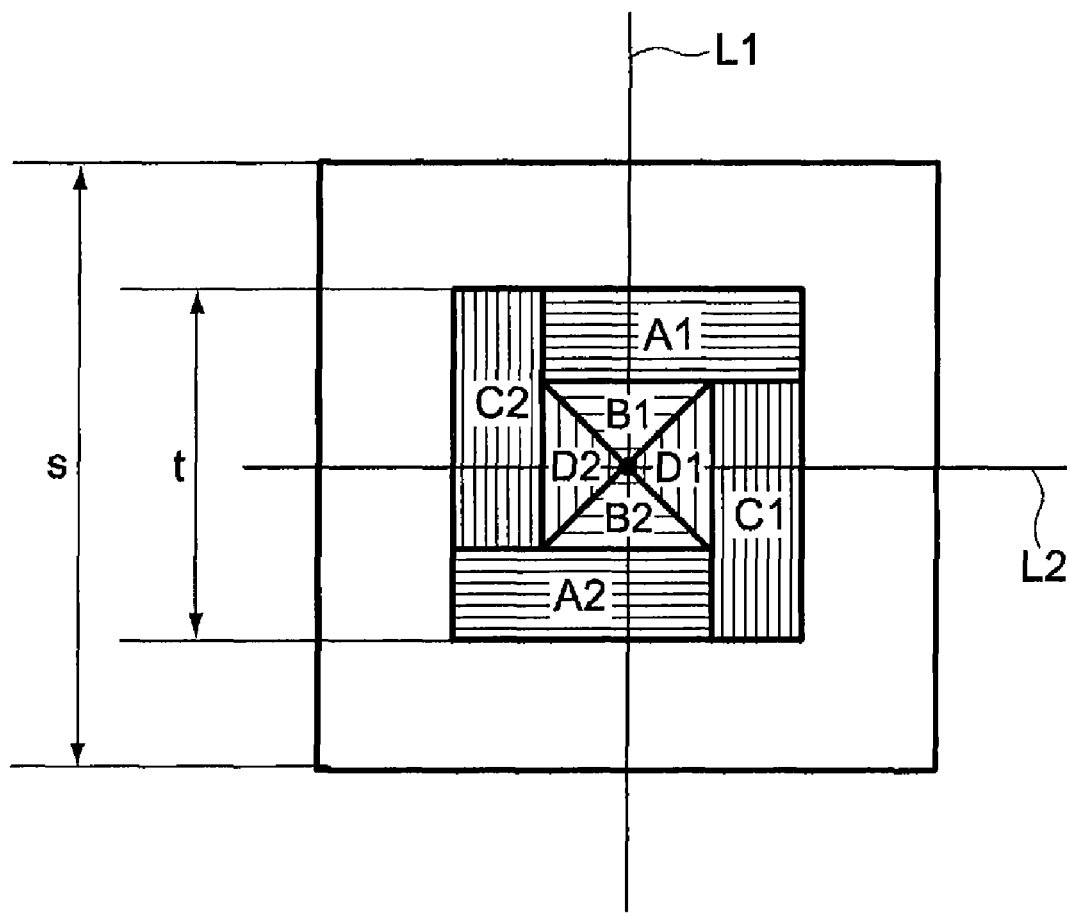
FIG. 12 is a plan view of a diffraction grating used in the displacement detection apparatus illustrated in FIG. 11.
Figure 12:
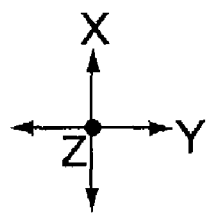

FIG. 12 is a plan view of the diffraction grating 112. The center of the diffraction grating 112 is a square, and a point J is the center point of the diffraction grating 112. The diffraction grating 112 has a first grating area including first areas A1 and A2 and second areas B1 and B2 that are aligned on a first line L1 parallel to the x axis and a second grating area having third areas C1 and C2 and fourth areas D1 and D2 that are aligned on a line L2 parallel to the y axis. The first areas A1 and A2 and the third areas C1 and C2 have the same first grating pitch. The second areas B1 and B2 and the fourth areas D1 and D2 have a second grating pitch that differs from the first grating pitch. Similar to the one-dimensional diffraction grating 12 illustrated in FIG. 3, when the first grating pitch is set to Λ, the second grating pitch is set to Λ+Λ/n (where n represents an integer greater than or equal to zero).

As described above, the diffraction grating 112 is a square in which the first grating areas A1, A2, B1, and B2 are disposed centrosymmetrically around the point J on the line L1 and the second grating areas C1, C2, D1, and D2 are disposed centrosymmetrically around the point J. In other words, the diffraction grating 112 has a two-dimensionally symmetrical structure. In this way, the center of measurement on the first line L1 and the center of measurement of the line L2 can be matched. For example, by simply combining two one-dimensional displacement detection apparatuses and positioning these close to each other, a two-dimensional displacement detection apparatus may be constituted. Actually, however, the centers of measurement cannot be matched on a two orthogonally intersecting axes. Therefore, measurement error occurs when the orientation of the table of the object to be measured on which the diffraction grating is attached changes. By using the diffraction grating 112, such problem can be solved.

The length s of a side of the scale is, for example 10 mm, and the length t of a side of the section of the diffraction grating is, for example, 5.7 mm but are not limited thereto.

Figure 13:
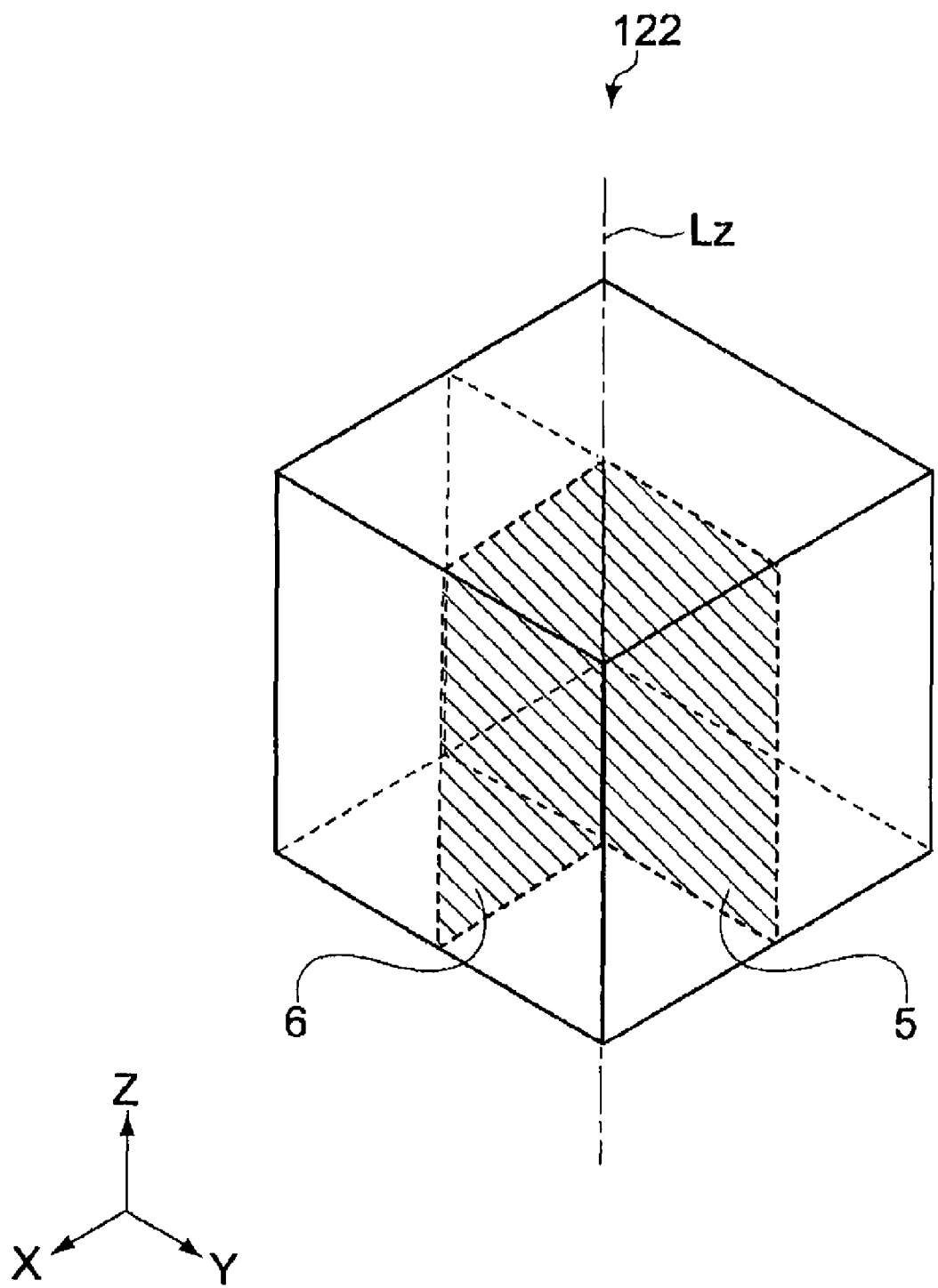
FIG. 13 is a perspective view of a main PBS installed in the displacement detection apparatus illustrated in FIG. 11.
Figure 14:
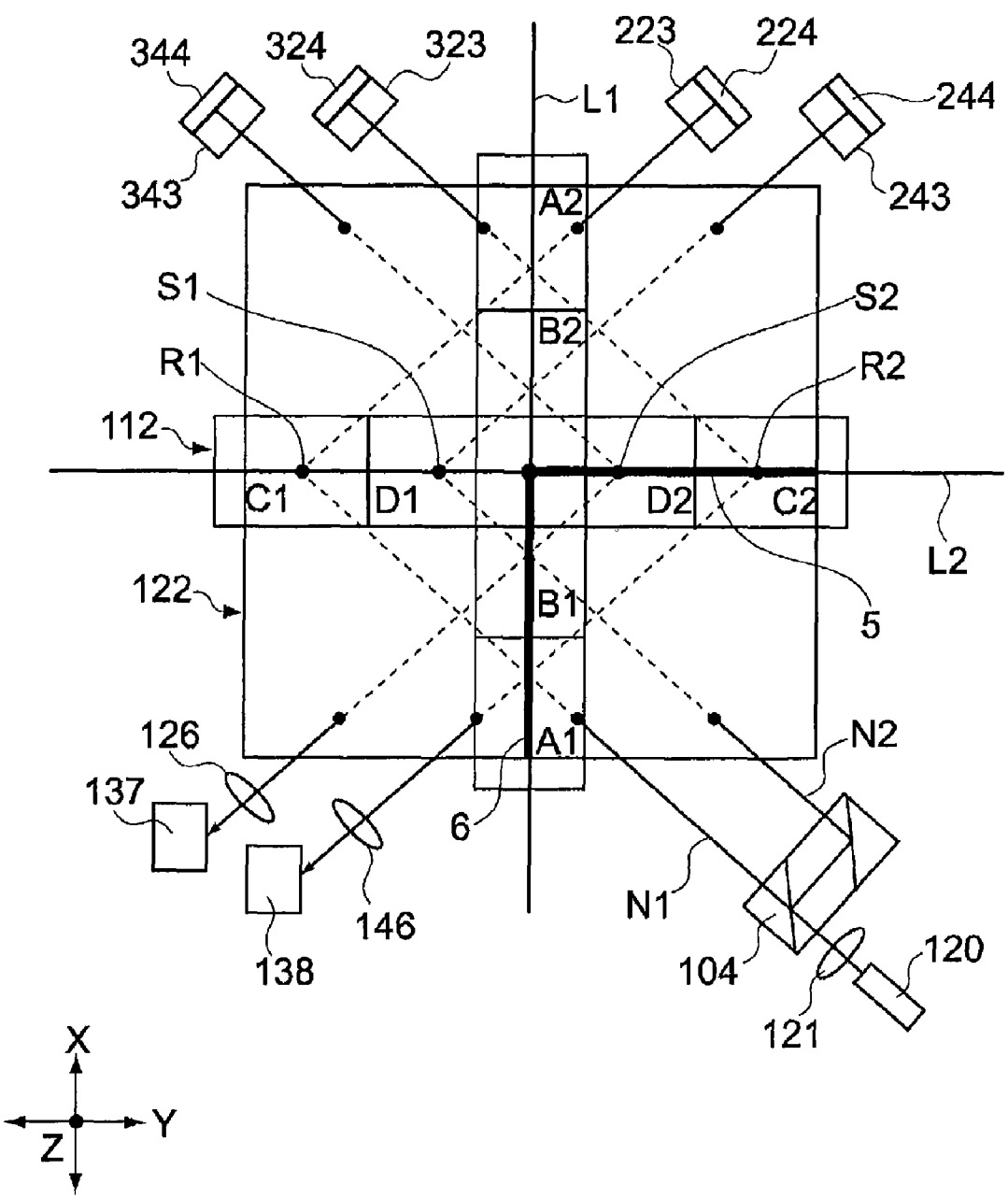
FIG. 14 is a plan view of the main PBS illustrated in FIG. 13.

FIG. 13 is a perspective view of the main PBS 122 installed in the two-dimensional displacement detection apparatus 2. FIG. 14 is a plan view of the main PBS 122. The main PBS 122 includes a first polarizing and splitting surface 5 used for displacement detection in the x axis direction and a second polarizing and splitting surface 6 orthogonal to the first polarizing and splitting surface 5. More specifically, the second polarizing and splitting surface 6 is orthogonal to a surface (xy plane) of the diffraction grating 112 and is orthogonal to the first polarizing and splitting surface 5.

In FIG. 14, the optical system of the first phase detecting unit 10 and the optical system of the second phase detecting unit 11 (light source 20, first quarter wavelength plate 23, mirror 24 and so on) are not shown.

The displacement detection apparatus 2 includes phase detecting units (third and fourth phase detecting units) similar to the first phase detecting unit 10 and the second phase detecting unit 11 included in the displacement detection apparatus 1. More specifically, as illustrated in FIG. 14, the third phase detecting unit of the displacement detection apparatus 2 includes a light source 120, a first lens 121, a first BS 104, a main PBS 122, a first quarter wavelength plate 223, a mirror 224, a first quarter wavelength plate 123, a mirror 124, a second lens 126, and third light-reception processing system 137.

Similarly, the fourth phase detecting unit of the displacement detection apparatus 2 shares the light source 120, the first lens 121, the first BS 104, and the main PBS 122. The first BS 104 generates a first laser beam N1 and a fourth laser beam N2. The second phase detecting unit includes a third quarter wavelength plate 243, a mirror 244, a fourth quarter wavelength plate 343, a mirror 344, a third lens 146, and a fourth light-reception processing system 138.

The configurations of the third light-reception processing system 137 and the fourth light-reception processing system 138 are the same as the configurations of the first light-reception processing system 37 and the second light-receiving processing system 38, respectively, and, therefore, descriptions thereof are not repeated here.

In other words, the optical system of the third phase detecting unit and the optical system of the fourth phase detecting unit are disposed at positions shifted by 90° on the xy plane from the positions of the optical system of the first phase detecting unit 10 and the optical system of the second phase detecting unit 11.

Figure 15:
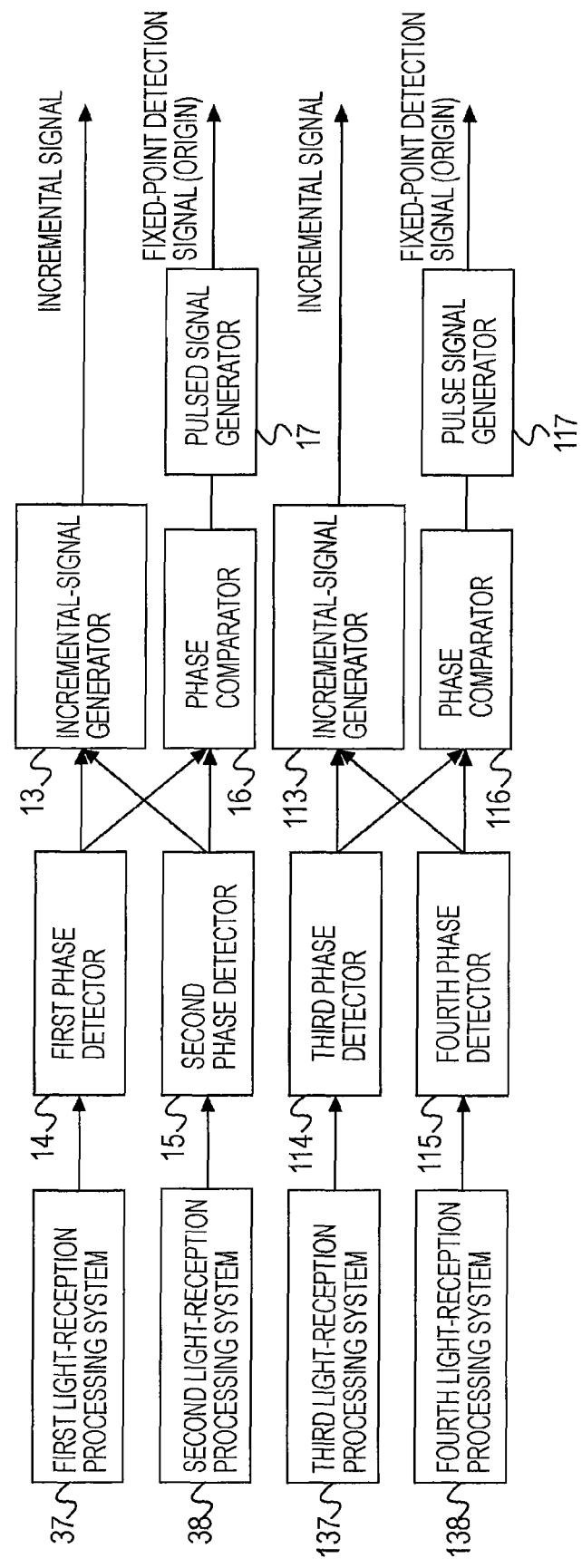
FIG. 15 is a block diagram illustrating a processing system of signals obtained at first to fourth light-receiving processing systems.

FIG. 15 is a block diagram illustrating a signal processing system constituted of the first to fourth light-reception processing systems 37, 38, 137, and 138. A signal obtained at the third light-reception processing system 137 is detected at the third phase detector 114, and a signal obtained at the fourth light-reception processing system 138 is detected at the fourth phase detector 115. With the displacement detection apparatus 1, the incremental-signal generator 13 sends out signals from the first light-reception processing system 37 and the second light-receiving processing system 38. However, according to an embodiment, the incremental-signal generator 13 can generate more detailed signals by setting the sum of the phase of the first phase detector 14 and the phase of the second phase detector 15 as the displacement amount. This is the same for the incremental-signal generator 113.

As described above, with the displacement detection apparatus 2 according to an embodiment, since the center of measurement of the x axis and the center of measurement of the y axis can be matched, the two-dimensional displacement can be detected without generating any measurement errors.

With the displacement detection apparatus 2 according to an embodiment, as illustrated in FIGS. 8 and 10, the main PBS 122, the four quarter wavelength plates, and the eight mirrors can be provided as a unit. Furthermore, the displacement detection apparatus 2 according to an embodiment may include the main PBS 222 illustrated in FIG. 16.

The present invention is not limited to the embodiments described above, and various modifications may be included in the scope of the invention.

The displacement detection apparatuses according to the above-described embodiments use diffraction gratings having areas A and B with difference grating pitches. However, a displacement detection apparatuses including a diffraction grating having only one grating pitch and not generating an origin signal may be used. In such a case, the displacement detection apparatus that carried out measurement in a one-dimensional manner (i.e., measurement of only the line L1) may include two quarter wavelength plates and two mirrors attached to the main PBS 22.

For the displacement detection apparatus 2 illustrated in FIG. 11, a configuration including a transmissive diffraction grating is also included in the scope of the present invention. With the displacement detection apparatus 2, a linear reflective diffraction grating is used. Instead, however, a radial diffraction grating such as that used in a rotary encoder may be employed.

Instead of employing a configuration in which the diffraction grating 12 or 112 moves, a configuration in which the optical system (main PBS 22 and so on) of the displacement detection apparatus 1 or 2 moves may be employed.

The components of the displacement detection apparatus 1 or 2 may be formed of ceramics or metal having an absolute value of $1\times10^{-6}$ or smaller for an expansion coefficient.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A displacement detection apparatus configured to detect a displacement on the basis of received-light intensity of an interference beam of two polarized beams obtained by splitting a laser beam, the displacement detection apparatus comprising:

a light source configured to emit the laser beam to be split into the two polarized beams;

a reflective diffraction grating configured to receive the two polarized beams, said reflective diffraction grating including:
  (a) a first grating disposed on a first line; and
  (b) a second grating disposed on a second line orthogonally intersecting with the first line on a plane on which the first grating is disposed, the first grating and the second grating being disposed two-dimensionally symmetrical on the plane;

two polarization altering elements configured to alter the polarization states of two diffracted beams of the two polarized beams obtained at the reflective diffraction grating;

two mirrors configured to reflect the beams whose polarization states have been altered at the two polarization altering elements and to guide the reflected beams to the two polarization altering elements, each of the mirrors corresponding to the polarization altering elements; and a polarization beam splitter provided as a unit with at least the two polarization altering elements, the polarization beam splitter including:
  (a) a polarizing and splitting surface configured to split the laser beam to generate the two polarized beams, said polarizing and splitting surface of the polarization beam splitter including:
    (i) a first polarizing and splitting surface configured to generate two first polarized beams; and
    (ii) a second polarizing and splitting surface configured to generate a second polarized beam, the second polarizing and splitting surface being disposed on a plane different from a plane on which the first polarizing and splitting surface is disposed; and
  (b) a transmissive area configured to guide:
    (i) the two polarized beams generated at the polarizing and splitting surface to the reflective diffraction grating;
    (ii) two return beams from the two polarization altering elements to the polarizing and splitting surface via the reflective diffraction grating so as to obtain the interference beam;

(iii) the first polarized beams generated at the first polarizing and splitting surface to the first grating; and (iv) the second polarized beams generated at the second polarizing and splitting surface to the second grating.

2. The displacement detection apparatus according to claim 1, wherein each mirror is provided as a unit with each polarization altering element.

3. The displacement detection apparatus according to claim 1, wherein the first polarizing and splitting surface and the second polarizing and splitting surface orthogonally intersect each other.

4. The displacement detection apparatus according to claim 1, wherein the incident angle on the diffraction grating of the polarized beam and the diffraction angle of the polarized beam at the diffraction grating are substantially the same.

5. The displacement detection apparatus according to claim 1, further comprising a beam generator configured to generate first and second laser beams from the laser beam emitted from the light source, wherein the diffraction grating includes:

(a) first areas having a first grating pitch; and (b) second areas having a second grating pitch different from the first grating pitch, wherein the polarizing and splitting surface of the polarization beam splitter splits the first laser beam to generate two first polarized beams and splits the second laser beam to generate two second polarized beams, and wherein the transmissive area of the polarization beam splitter guides the two first polarized beams to the first areas and guides the two second polarized beams to the second areas.

6. The displacement detection apparatus according to claim 1, further comprising:

(a) a first beam generator configured to generate first and second laser beams; and (b) a second beam generator configured to generate third and fourth laser beams, wherein the diffraction grating includes:

(i) a first grating including first areas having a first grating pitch and second areas having a second grating pitch different from the first grating pitch; and (ii) a second grating including third areas having the first grating pitch and fourth areas having the second grating pitch, wherein the first polarizing and splitting surface of the polarization beam splitter splits the first laser beam to generate the two first polarized beams and splits the second laser beam to generate the two second polarized beams, wherein the second polarizing and splitting surface of the polarization beam splitter splits the third laser beam to generate two third polarized beams and splits the fourth laser beam to generate two fourth polarized beams, and wherein the transmissive area of the polarization beam splitter guides the two first polarized beams, the two second polarized beams, the two third polarized beams, and the two fourth polarized beams to the first, second, third, and fourth areas, respectively.

7. The displacement detection apparatus according to claim 1, wherein the diffraction grating is a volume-type hologram including:

(a) an incident surface on which the two polarized beams are incident; and (b) a reflective mesh film provided on the incident surface.

8. The displacement detection apparatus according to claim 1, wherein the transmissive area of the polarization beam splitter is constituted of glass having an absolute value of an expansion coefficient of $1 \times 10^{-6}$ or smaller.

9. The displacement detection apparatus according to claim 1, wherein the polarizing and splitting surface of the polarization beam splitter generates the two polarized beams so that the two polarized beams move away from each other, and wherein the transmissive area of the polarization beam splitter includes a reflective surface for emitting the two polarized beams moving away from the polarization beam splitter so that the two polarized beams move closer to each other.

10. A displacement detection apparatus configured to detect a two-dimensional displacement on the basis of the received-light intensity of a first interference beam of two first polarized beams and the received-light intensity of a second interference beam of two second polarized beams, the first and second polarized beams being included in a plurality of polarized beams obtained by splitting a laser beam, the displacement detection apparatus comprising:

a light source configured to emit the laser beam to be split into the plurality of polarized beams;

a diffraction grating including:

(a) a first grating disposed on a first line, the two first polarized beams being incident on the first grating; and (b) a second grating disposed on a second line orthogonally intersecting with the first line on a plane on which the first grating is disposed, the two second polarized beams being incident on the second grating, the first grating and the second grating being symmetrically disposed two-dimensionally on the plane;

four polarization altering elements configured to alter the polarization states of four diffracted beams of the two first polarized beams and the two second polarized beams obtained at the diffraction grating;

four mirrors configured to reflect the four beams whose polarization states have been altered at the polarization altering elements and to guide the reflected beams to the four polarization altering elements, each of the mirrors corresponding to each of the polarization altering elements; and a polarization beam splitter including:

(a) a first polarizing and splitting surface configured to split the laser beam to generate the two first polarized beams;

(b) a second polarizing and splitting surface configured to split the laser beam to generate the two second polarized beams, the second polarizing and splitting surface being disposed on a plane different from the first polarizing and splitting surface, and (c) a transmissive area configured to guide the two first polarized beams to the first grating, to guide the two second polarized beams to the second grating, and to guide fourth return beams from the four polarization altering elements to the corresponding first and second polarizing and splitting surfaces via the diffraction grating so as to obtain the first and second interference beams.

11. The displacement detection apparatus according to claim 10, further comprising:

a first beam generator configured to generate first and second laser beams; and a second beam generator configured to generate third and fourth laser beams, wherein the diffraction grating includes:

(a) the first grating including first areas having a first grating pitch and second areas having a second grating pitch different from the first grating pitch; and (b) the second grating including third areas having the first grating pitch and fourth areas having the second grating pitch, wherein the first polarizing and splitting surface of the polarization beam splitter splits the first laser beam to generate two first polarized beams and splits the third laser beam to generate the two third polarized beams, wherein the second polarizing and splitting surface of the polarization beam splitter splits the second laser beam to generate the two second polarized beams and splits the fourth laser beam to generate two fourth polarized beams, and wherein the transmissive area of the polarization beam splitter guides the two first polarized beams and the two third polarized beams to the first and second areas, respectively, and guides the two second polarized beams and the two fourth polarized beams to the second and fourth areas, respectively.

12. A polarization beam splitter used for a displacement detection apparatus including a light source for emitting a laser beam, a diffraction grating for receiving a plurality of polarized beams obtained by splitting the laser beam emitted from the light source, the diffraction grating including a first grating disposed on a first line, the first grating including: (i) first areas having a first grating pitch, the first areas receiving two first polarized beams of the plurality of polarized beams; and (ii) second areas having a second grating pitch different from the first grating pitch, the second areas receiving two second polarized beams, a second grating disposed on a second line orthogonally intersecting with the first line on a plane on which the first grating is disposed, the second grating including: (A) third areas having the first grating pitch, the third areas receiving two third polarized beams; and (B) fourth areas having the second grating pitch, the fourth areas receiving two fourth polarized beams a plurality of polarization altering elements for altering the polarization states of a plurality of diffracted beams of the plurality of polarized beams obtained at the diffraction grating, and a plurality of mirrors for reflecting the beams whose polarization states are altered by the polarization altering elements and for guiding the reflected beams to the polarization altering elements, each of the mirrors corresponding to each of the polarization altering elements, the polarization beam splitter comprising:

a polarizing and splitting surface configured to split the laser beam and generate the plurality of polarized beams, said polarizing and splitting surface including:

(a) a first polarizing and splitting surface configured to generate the two first polarized beams and the two second polarized beams; and (b) a second polarizing and splitting surface configured to generate the two third polarized beams and the two fourth polarized beams, the second polarizing and splitting surface being disposed on a plane different from the place on which the first polarizing and splitting surface is disposed; and a transmissive area configured to guides (a) the polarized beams generated by the polarizing and splitting surface to the diffraction grating;

(b) return beams from the polarization altering elements to the polarizing and splitting surface via the diffraction grating so as to obtain interference beams of the polarized beams (c) two of each of the first, second, third, and fourth polarized beams to each of the first, second, third, and fourth areas, respectively; and (d) four return beams from four polarization altering elements to the corresponding first and second polarizing and splitting surfaces via the diffraction grating so as to obtain first, second, third, and fourth interference beams corresponding to the first, second, third, and fourth polarized beams, respectively.

13. A diffraction grating used for a displacement detection apparatus including a light source for generating a laser beam and a beam generator for generating first, second, third, and fourth laser beams from the laser beam emitted from the light source, the displacement detection apparatus detecting a two-dimensional displacement on the basis of the received-light intensities of a first interference beam of two first polarized beams obtained by splitting the first laser beam and a second interference beam of two second polarized beams obtained by splitting the second laser beam, the received-light intensities of a third interference beam of two third polarized beams obtained by splitting the third laser beam and a fourth interference beam of two fourth polarized beams obtained by splitting the fourth laser beam, the diffraction grating comprising:

a first grating disposed on a first line, the first grating including:

(a) first areas having a first grating pitch, the first areas receiving the two first polarized beams; and (b) second areas having a second pitch different from the first pitch, the second areas receiving the two second polarized beams; and a second grating disposed on a second line orthogonally intersecting with the first line on a plane on which the first grating is disposed, the second grating including third areas having the first grating pitch, the third areas receiving the two third polarized beams; and fourth areas having the second pitch, the fourth areas receiving the two fourth polarized beams.

14. A displacement detection apparatus configured to detect a displacement on the basis of the received-light intensity of an interference beam of two polarized beams obtained by splitting a laser beam, the displacement detection apparatus comprising:

a light source configured to emit the laser beam to be split into the two polarized beams;

a reflective diffraction grating configured to receive the two polarized beams;

two polarization altering elements configured to alter the polarization states of two diffracted beams of the two polarized beams obtained at the diffraction grating;

two mirrors configured to reflect the beams whose polarization states have been altered at the two polarization altering elements and to guide the reflected beams to the two polarization altering elements, each of the mirrors corresponding to the polarization altering elements; and a polarization beam splitter provided as a unit with at least the two polarization altering elements, the polarization beam splitter including:

(a) a polarizing and splitting surface configured to split the laser beam to generate the two polarized beams; and (b) a transmissive area configured to guide the two polarized beams generated at the polarizing and splitting surface to the diffraction grating and to guide two return beams from the two polarization altering elements to the polarizing and splitting surface via the diffraction grating so as to obtain the interference beam; and a beam generator configured to generate first and second laser beams from the laser beam emitted from the light source, wherein the diffraction grating includes:
(a) first areas having a first grating pitch and
(b) second areas having a second grating pitch different from the first grating pitch, wherein the polarizing and splitting surface of the polarization beam splitter splits the first laser beam to generate two first polarized beams and splits the second laser beam to generate two second polarized beams, and wherein the transmissive area of the polarization beam splitter guides the two first polarized beams to the first areas and guides the two second polarized beams to the second areas.

15. A displacement detection apparatus configured to detect a displacement on the basis of the received-light intensity of an interference beam of two polarized beams obtained by splitting a laser beam, the displacement detection apparatus comprising:

a light source configured to emit the laser beam to be split into the two polarized beams;
a reflective diffraction grating configured to receive the two polarized beams;
two polarization altering elements configured to alter the polarization states of two diffracted beams of the two polarized beams obtained at the diffraction grating;
two mirrors configured to reflect the beams whose polarization states have been altered at the two polarization altering elements and to guide the reflected beams to the two polarization altering elements, each of the mirrors corresponding to the polarization altering elements; and
a polarization beam splitter provided as a unit with at least the two polarization altering elements, the polarization beam splitter including:
(a) a polarizing and splitting surface configured to split the laser beam to generate the two polarized beams; and
(b) a transmissive area configured to guide the two polarized beams generated at the polarizing and splitting surface to the diffraction grating and to guide two return beams from the two polarization altering elements to the polarizing and splitting surface via the diffraction grating so as to obtain the interference beam;
wherein the polarizing and splitting surface of the polarization beam splitter generates the two polarized beams so that the two polarized beams move away from each other, and
wherein the transmissive area of the polarization beam splitter includes a reflective surface for emitting the two polarized beams moving away from the polarization beam splitter so that the two polarized beams move closer to each other.

* * * * *